(12) United States Patent
Shinto

(10) Patent No.: US 9,075,198 B2
(45) Date of Patent: Jul. 7, 2015

(54) WAVELENGTH TUNABLE INTERFERENCE FILTER, METHOD OF MANUFACTURING WAVELENGTH TUNABLE INTERFERENCE FILTER, OPTICAL APPARATUS, AND OPTICAL COMPONENT

(71) Applicant: Seiko Epson Corporation, Tokyo (JP)

(72) Inventor: Susumu Shinto, Suwa (JP)

(73) Assignee: Seiko Epson Corporation (JP)

( * ) Notice: Subject to any disclaimer, the term of this patent is extended or adjusted under 35 U.S.C. 154(b) by 94 days.

(21) Appl. No.: 14/041,500

(22) Filed: Sep. 30, 2013

(65) Prior Publication Data
US 2014/0092478 A1 Apr. 3, 2014

(30) Foreign Application Priority Data
Oct. 1, 2012 (JP) .................................. 2012-219140

(51) Int. Cl.
*G02B 5/28* (2006.01)
*G02B 26/00* (2006.01)

(52) U.S. Cl.
CPC ................ *G02B 5/28* (2013.01); *G02B 26/001* (2013.01)

(58) Field of Classification Search
CPC ................................. G02B 5/28; G02B 26/001
See application file for complete search history.

(56) References Cited

U.S. PATENT DOCUMENTS

2007/0242920 A1* 10/2007 Lin et al. ........................ 385/27

FOREIGN PATENT DOCUMENTS

JP        2003-222904 A        8/2003

* cited by examiner

*Primary Examiner* — Joseph P Martinez
(74) *Attorney, Agent, or Firm* — Harness, Dickey & Pierce, P.L.C.

(57) ABSTRACT

A wavelength tunable interference filter, an optical apparatus, and an optical component include a first substrate, which includes a first optical film and a first driving electrode, and a second substrate, which includes a support portion that supports the first substrate, a second optical film, and a second driving electrode. The second substrate includes an external connection electrode extending to an outer side of the support portion, and includes an electrode forming surface on which the external connection electrode is disposed. A plurality of protruding portions protruding from the electrode forming surface are formed so as to be arrayed in a direction crossing the extending direction of the external connection electrode.

14 Claims, 20 Drawing Sheets

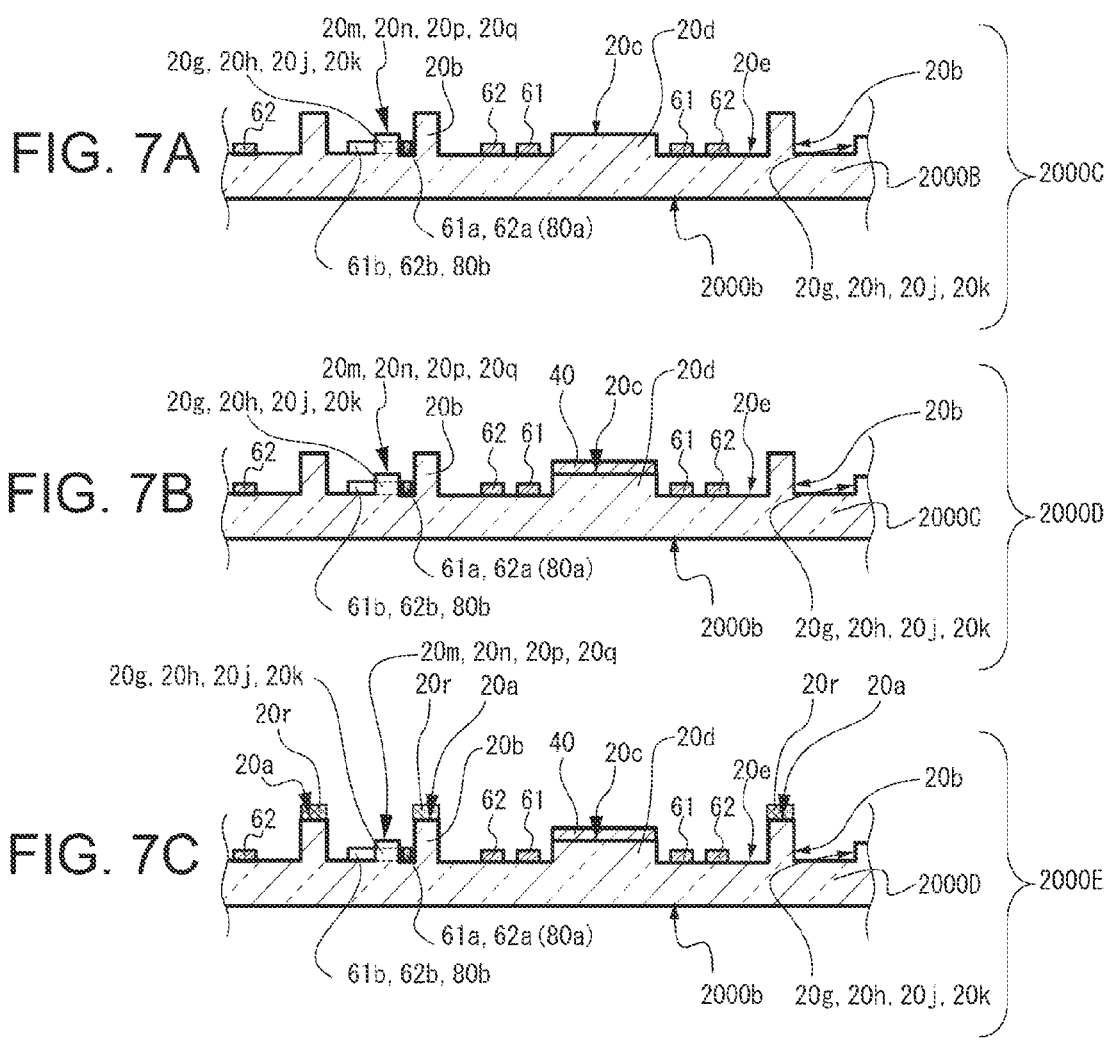

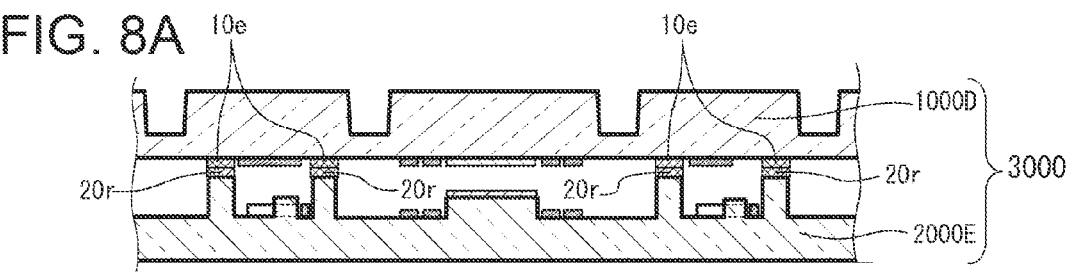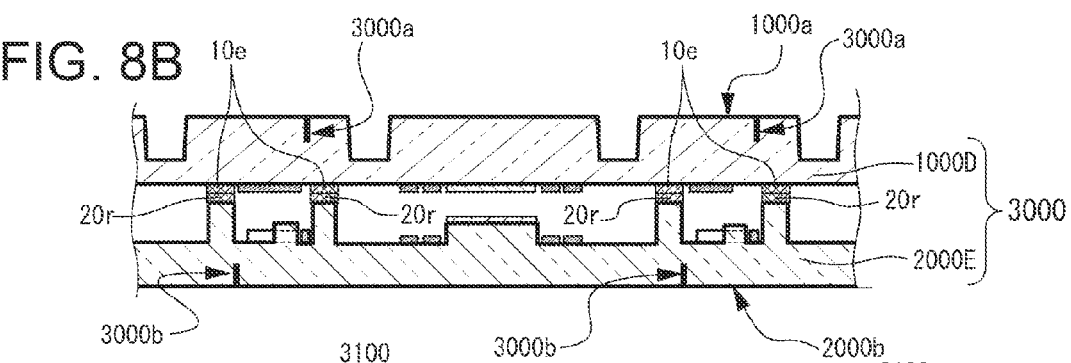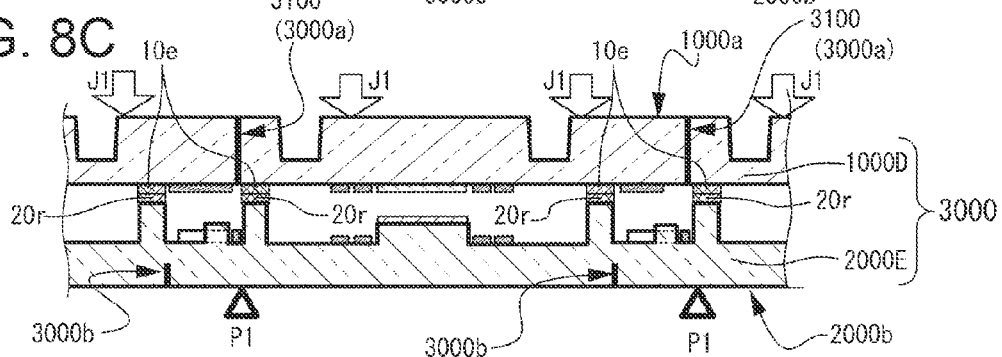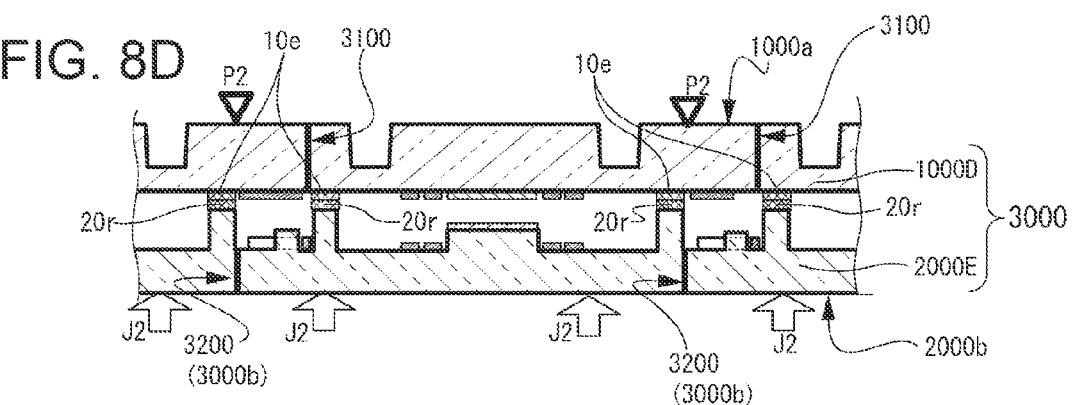

WAVELENGTH TUNABLE INTERFERENCE FILTER, METHOD OF MANUFACTURING WAVELENGTH TUNABLE INTERFERENCE FILTER, OPTICAL APPARATUS, AND OPTICAL COMPONENT

BACKGROUND

1. Technical Field

The present invention relates to a wavelength tunable interference filter, a method of manufacturing a wavelength tunable interference filter, an optical apparatus, and an optical component.

2. Related Art

As a method of manufacturing a wavelength tunable interference filter, a method of forming first and second reflective films that form a Fabry-Perot resonator on first and second substrates, respectively, and bonding the first and second substrates to each other can be considered. In this case, it is possible to manufacture a first wafer as a collection of a plurality of first substrates and a second wafer as a collection of a plurality of second substrates, bond the first and second wafers to each other to form a collection of a plurality of devices, and finally separate the collection of the plurality of devices into individual devices using a method called dicing, which is a cutting method using a grindstone, or breaking by bending. Such a manufacturing method is similar to a method of manufacturing a liquid crystal display body. Accordingly, problems occurring in the method of manufacturing a liquid crystal display body may also occur in the manufacturing of the wavelength tunable interference filter.

As means for preventing damage to a wire group due to the breaking of a glass substrate, JP-A-2003-222904 discloses a technique of preventing damage to and breakage of the wire group by forming a recess below the wire group on the array substrate below the color filter breaking surface to increase a gap between a breaking portion and the wire group and forming a planarization film on the wire group to reduce pressure applied to the wire group.

In the configuration disclosed in JP-A-2003-222904, however, a gap exceeding the amount of interference of a color filter breaking portion is formed. Accordingly, when the interference of the color filter breaking portion exceeding the setting value (assumed value) occurs, damage to the wire group of the array substrate has been inevitable.

SUMMARY

An advantage of some aspects of the invention is to provide a wavelength tunable interference filter capable of preventing damage to and breakage of a wire group due to a breaking portion, a method of manufacturing the wavelength tunable interference filter, an optical apparatus and an optical component using the wavelength tunable interference filter.

The invention can be implemented as the following forms or application examples.

Application Example 1

This application example is directed to a wavelength tunable interference filter including: a first substrate; a second substrate that is disposed so as to face the first substrate and includes a support portion that supports the first substrate; a first optical film provided on the first substrate; a first driving electrode that is provided on the first substrate and that is provided outside the first optical film in plan view when viewed from a thickness direction of the first and second substrates; a second optical film that is provided on the second substrate and that is disposed so as to face the first optical film; and a second driving electrode that is provided on the second substrate and that is disposed between the second optical film and the support portion so as to face the first driving electrode in the plan view. The second substrate includes an external connection electrode extending to an outer side of the support portion, and includes an electrode forming surface on which the external connection electrode is disposed. A plurality of protruding portions protruding from the electrode forming surface are formed so as to be arrayed in a direction crossing the extending direction of the external connection electrode.

A wavelength tunable interference filter is manufactured by a wafer process, and a collection of wavelength tunable interference filters are manufactured by bonding a wafer on which a collection of first substrates are formed to a wafer on which a collection of second substrates are formed. When breaking the collection of wavelength tunable interference filters, there is a possibility that an end of the first substrate will come in contact with a connection electrode formed on the second substrate to break the connection electrode.

Therefore, in the wavelength tunable interference filter according to this application example, a plurality of protruding portions are formed on the electrode forming surface, on which the connection electrode is disposed, on the outer side of the support portion of the second substrate. Accordingly, at the time of breaking for obtaining individual wavelength tunable interference filters from the collection of wavelength tunable interference filters, even if the end of the first substrate is brought close to the connection electrode of the second substrate, the end of the first substrate comes in contact with the protruding portions formed on the second substrate. As a result, it is possible to suppress damage to the connection electrode, such as the breakage of the connection electrode.

Application Example 2

This application example is directed to the wavelength tunable interference filter according to the application example described above, wherein a top of each of the protruding portions in a protruding direction is on the same plane as an optical film forming surface of the second substrate on which the second optical film is formed.

According to this application example, a surface of the top of each protruding portion can be formed in the same step as the step of forming the optical film forming surface of the second substrate. Therefore, since a step of forming a protruding portion is not necessary, it is possible to suppress an increase in the manufacturing cost of the wavelength tunable interference filter.

Application Example 3

This application example is directed to the wavelength tunable interference filter according to the application example described above, wherein the first substrate includes a bonding region of the first substrate for bonding to the support portion of the second substrate and an external connection electrode extending to an outer side of the bonding region, and includes an electrode forming surface on which the external connection electrode is disposed, and a plurality of protruding portions protruding from the electrode forming surface are formed so as to be arrayed in a direction crossing the extending direction of the external connection electrode.

According to this application example, a plurality of protruding portions are formed on the electrode forming surface of the connection electrode disposed outside the bonding region of the first substrate for bonding to the second substrate. Therefore, at the time of breaking for obtaining individual wavelength tunable interference filters from the collection of wavelength tunable interference filters, even if an end of the second substrate is brought close to the connection electrode of the first substrate, the end of the second substrate comes in contact with the protruding portions formed on the first substrate. As a result, it is possible to suppress damage to the connection electrode, such as the breakage of the connection electrode.

Application Example 4

This application example is directed to a method of manufacturing a wavelength tunable interference filter including a first substrate, which includes a first optical film and a first driving electrode formed outside the first optical film in plan view, and a second substrate, which includes a support portion that supports the first substrate, a second optical film disposed so as to face the first optical film, and a second driving electrode disposed between the second optical film and the support portion so as to face the first driving electrode. The method includes: forming a first wafer that is a collection of a plurality of the first substrates; forming a second wafer that is a collection of a plurality of the second substrates; forming a bonded wafer by bonding the first and second wafers to each other such that the first and second optical films face each other; and separating the bonded wafer into individual pieces. The forming of the second wafer includes forming the support portion and an optical film forming surface, on which the second optical film is formed, by etching and forming a plurality of protruding portions on a driving electrode arrangement surface, on which the second driving electrode is disposed, and the electrode arrangement surface outside the support portion by etching.

According to the method of manufacturing a wavelength tunable interference filter of this application example, for a plurality of protruding portions formed on the electrode forming surface, on which the connection electrode is disposed, on the outer side of the support portion of the second substrate, a step of forming an optical surface on which the second optical film is formed and a step of forming an electrode arrangement surface are executed. Therefore, it is possible to form, on the second substrate, protruding portions capable of preventing damage to the connection electrode of the second substrate, such as the breakage of the connection electrode of the second substrate, even if the end of the first substrate is brought close to the connection electrode of the second substrate at the time of breaking for obtaining individual wavelength tunable interference filters from the collection of wavelength tunable interference filters. Therefore, since an additional step of forming protruding portions is not necessary and breaking after scribing can be adopted as a simple method for obtaining individual pieces, it is possible to suppress the manufacturing cost.

Application Example 5

This application example is directed to an optical apparatus including a first substrate; a second substrate that is disposed so as to face the first substrate and includes a support portion that supports the first substrate; a first optical film provided on the first substrate; a first driving electrode that is provided on the first substrate and that is provided outside the first optical film in plan view when viewed from a thickness direction of the first and second substrates; a second optical film that is provided on the second substrate and that is disposed so as to face the first optical film; and a second driving electrode that is provided on the second substrate and that is disposed between the second optical film and the support portion so as to face the first driving electrode in the plan view. The second substrate includes an external connection electrode extending to an outer side of the support portion, and includes an electrode forming surface on which the external connection electrode is disposed. A plurality of protruding portions protruding from the electrode forming surface are formed so as to be arrayed in a direction crossing the extending direction of the external connection electrode.

The optical apparatus of this application example includes a wavelength tunable interference filter of stable quality in which a plurality of protruding portions are formed on the electrode forming surface, on which the connection electrode is disposed, on the outer side of the support portion of the second substrate and which can prevent damage to the connection electrode, such as the breakage of the connection electrode, since the end of the first substrate comes in contact with the protruding portions formed on the second substrate even if the end of the first substrate is brought close to the connection electrode of the second substrate at the time of breaking for obtaining individual wavelength tunable interference filters from the collection of wavelength tunable interference filters. As a result, it is possible to obtain an optical apparatus of stable performance.

Application Example 6

This application example is directed to the optical apparatus according to the application example described above, wherein a top of each of the protruding portions in a protruding direction is on the same plane as an optical film forming surface of the second substrate on which the second optical film is formed.

According to this application example, a surface of the top of each protruding portion can be formed in the same step as the step of forming the optical film forming surface of the second substrate. Therefore, it is possible to obtain an optical apparatus including a wavelength tunable interference filter of low cost for which a step of forming protruding portions is not necessary.

Application Example 7

This application example is directed to an optical component including: a first substrate; and a second substrate disposed so as to face the first substrate. A part of the second substrate is disposed so as to extend from the first substrate in plan view when the first and second substrates are viewed from a thickness direction. The first substrate includes a first optical film and a first driving electrode provided outside the first optical film in the plan view. The second substrate includes a second optical film disposed so as to face the first optical film, a second driving electrode disposed so as to face the first driving electrode, a support portion that is provided outside the second driving electrode in the plan view and supports the first substrate, an external connection electrode extending from a region where the first and second substrates face each other toward a region of the second substrate extending from the first substrate, and an electrode forming surface which is the region of the second substrate extending from the first substrate and on which the external connection electrode is formed. The electrode forming surface includes a plurality of protruding portions, and the plurality of protruding portions are arrayed in a direction crossing the extending direction of the external connection electrode.

According to the optical component of this application example, a plurality of protruding portions are formed on the electrode forming surface, on which the connection electrode is disposed, on the outer side of the support portion of the second substrate. Therefore, at the time of breaking for obtaining individual wavelength tunable interference filters from the collection of wavelength tunable interference filters, even if the end of the first substrate is brought close to the connection electrode of the second substrate, the end of the first substrate comes in contact with the protruding portions formed on the second substrate. As a result, it is possible to suppress damage to the connection electrode, such as the breakage of the connection electrode.

Application Example 8

This application example is directed to an optical component including a first substrate and a second substrate disposed so as to face the first substrate. Apart of the second substrate is disposed so as to extend from the first substrate in plan view when the first and second substrates are viewed from a thickness direction. The second substrate includes an external connection electrode, which extends from a region where the first and second substrates face each other toward a region of the second substrate extending from the first substrate, and an electrode forming surface, which is the region of the second substrate extending from the first substrate and on which the external connection electrode is formed. The electrode forming surface includes a plurality of protruding portions, and the plurality of protruding portions are arrayed in a direction crossing the extending direction of the external connection electrode.

According to the optical component of this application example, a plurality of protruding portions are formed on the electrode forming surface, on which the connection electrode is disposed, on the outer side of the support portion of the second substrate. Therefore, at the time of breaking for obtaining individual wavelength tunable interference filters from the collection of wavelength tunable interference filters, even if the end of the first substrate is brought close to the connection electrode of the second substrate, the end of the first substrate comes in contact with the protruding portions formed on the second substrate. As a result, it is possible to suppress damage to the connection electrode, such as the breakage of the connection electrode.

BRIEF DESCRIPTION OF THE DRAWINGS

The invention will be described with reference to the accompanying drawings, wherein like numbers reference like elements.

FIGS. 7A to 7C are cross-sectional views showing a method of manufacturing a second substrate of the wavelength tunable interference filter according to the third embodiment.

FIGS. 8A to 8D are cross-sectional views showing a method of manufacturing the wavelength tunable interference filter according to the third embodiment.

DESCRIPTION OF EXEMPLARY EMBODIMENTS

Hereinafter, embodiments of the invention will be described with reference to the accompanying drawings.

First Embodiment

Figure 1A:
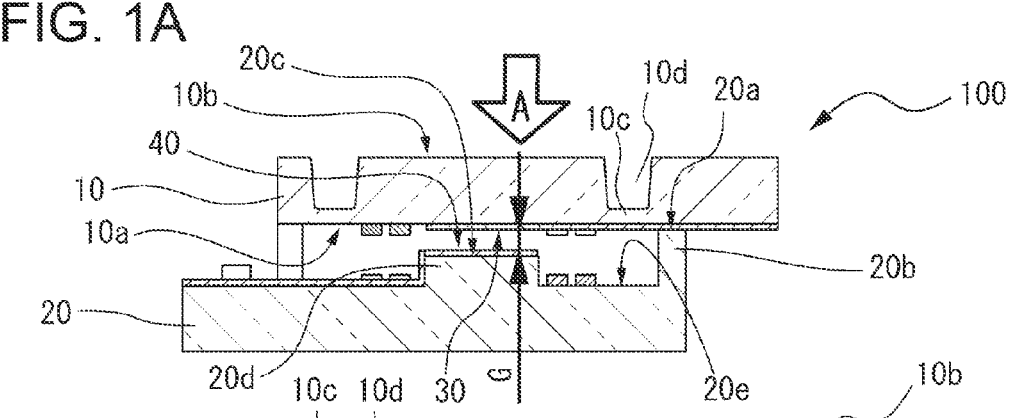
FIG. 1A is a schematic cross-sectional view of a wavelength tunable interference filter according to a first embodiment.

FIG. 1A schematically shows a variable gap etalon filter capable of controlling a gap between optical films as an example of a wavelength tunable interference filter according to a first embodiment. As shown in FIG. 1A, a variable gap etalon filter 100 (hereinafter, referred to as an etalon filter 100) as a wavelength tunable interference filter according to the present embodiment is configured to include a first substrate 10 formed of a light transmissive material, for example, various kinds of glass, such as soda glass, crystalline glass, quartz glass, lead glass, potassium glass, and alkali-free glass, or crystal and a second substrate 20 including a support portion 20b that has a bonding surface 20a, which is bonded to the first substrate 10, on the end surface.

Figure 1B:
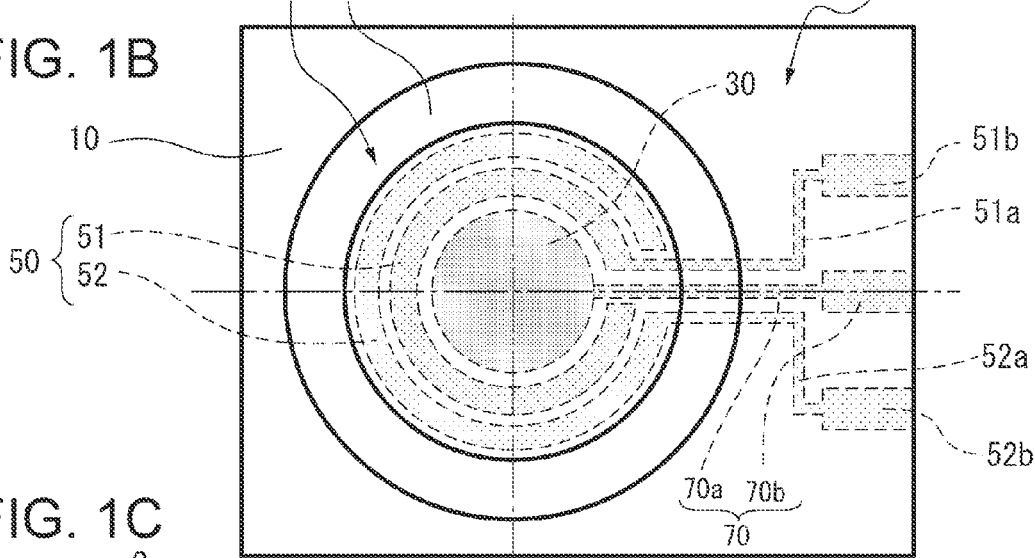
FIG. 1B is a plan view of the wavelength tunable interference filter according to the first embodiment when viewed from the direction of the arrow A shown in FIG. 1A.

FIG. 1B is a plan view of the first substrate 10 when viewed from the direction of the arrow A shown in FIG. 1A. As shown in FIGS. 1A and 1B, a first optical film 30 having both transmission and reflection characteristics with respect to light in a desired wavelength range is formed on a substrate surface 10a (hereinafter, referred to as a first mirror forming surface 10a) as an optical surface of the first substrate 10. A circumferential groove 10d that forms a thin diaphragm portion 10c is formed on the other surface 10b of the first substrate 10 with the planar center of the first optical film 30 as its approximate center.

Figure 1C:
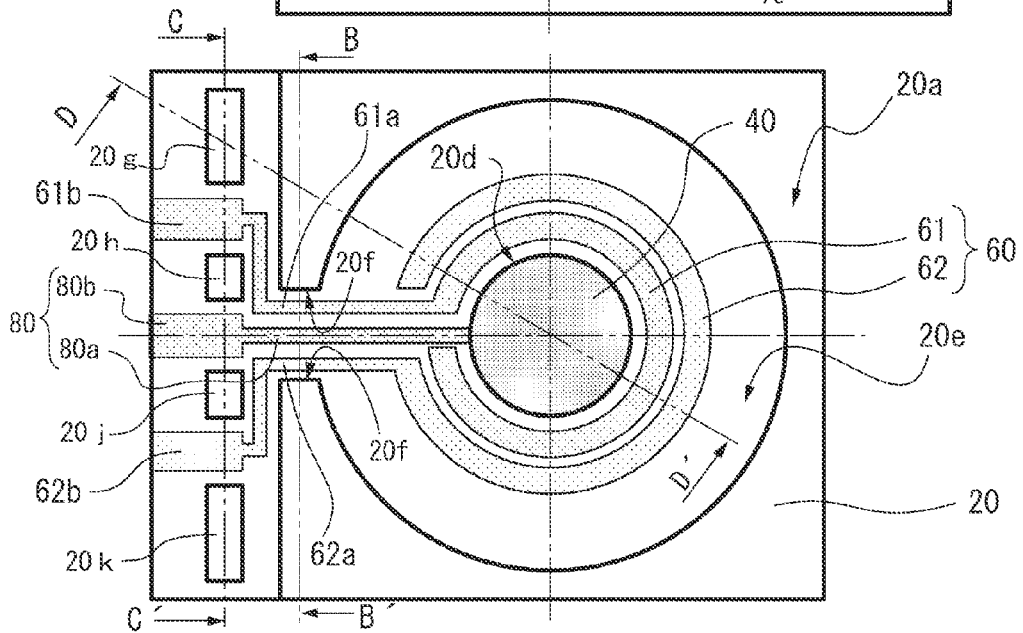
FIG. 1C is a plan view of a second substrate when viewed from the direction of the arrow A shown in FIG. 1A.

FIG. 1C is a plan view of the second substrate 20 when viewed from the direction of the arrow A shown in FIG. 1A, that is, a plan view of the second substrate 20 from the direction of the arrow A in a state where the first substrate 10 shown in FIG. 1A is excluded. As shown in FIGS. 1A and 1C, the second substrate 20 includes the support portion 20b that has the bonding surface 20a, which supports and is bonded to the first mirror forming surface 10a of the first substrate 10, at the end. Inside the support portion 20b, a second mirror forming surface 20c, which faces the first optical film 30 formed on the first substrate 10 and serves as an optical surface formed so as to configure a predetermined gap G, is formed at the end of a second mirror forming portion 20d. A second optical film 40 having both transmission and reflection characteristics with respect to light in a desired wavelength range is formed on the second mirror forming surface 20c.

As each of the first and second optical films 30 and 40, for example, a metal film, such as Ag, and a conductive alloy film, such as an Ag alloy, can be used. When using a metal film, such as Ag, it is preferable to include a protective film (not shown) in order to suppress the deterioration of Ag. In addition, as each of the first and second optical films 30 and 40, it is possible to use a dielectric multilayer film formed by laminating a high refractive index layer and a low refractive index layer alternately. For example, each of the first and second optical films 30 and 40 can be formed by forming $TiO_2$ as a high refractive index layer and $SiO_2$ as a low refractive index layer.

On the first mirror forming surface 10a of the first substrate 10, a first driving electrode 50 is formed outside the first optical film 30. In the present embodiment, the first driving electrode 50 is formed by a double electrode of a first driving inside electrode 51 close to the first optical film 30 and a first driving outside electrode 52. In addition, the first driving electrode 50 is not limited to the double electrode of the first driving inside electrode 51 and the first driving outside electrode 52 shown in the present embodiment, but may be multiple electrodes of three or more.

An electrode forming surface 20e, which is formed to be lower than the second mirror forming surface 20c, is formed outside the second mirror forming portion 20d of the second substrate 20. A second driving electrode 60 formed by a second driving inside electrode 61 and a second driving outside electrode 62, which are disposed and formed so as to face the first driving electrode 50, is formed on the electrode forming surface 20e.

In order to electrically connect the driving electrodes 50 and 60 to an external control unit (not shown), a connection electrode formed near the outer edge of one of the substrates 10 and 20 and a connection wire connecting the connection electrode and each driving electrode are formed as shown in FIGS. 1B and 1C for each of the driving electrodes 50 and 60. In the first driving electrode 50, the first driving inside electrode 51 is electrically connected to a connection electrode 51b through a connection wire 51a, and the first driving outside electrode 52 is electrically connected to a connection electrode 52b through a connection wire 52a.

Figure 2A:
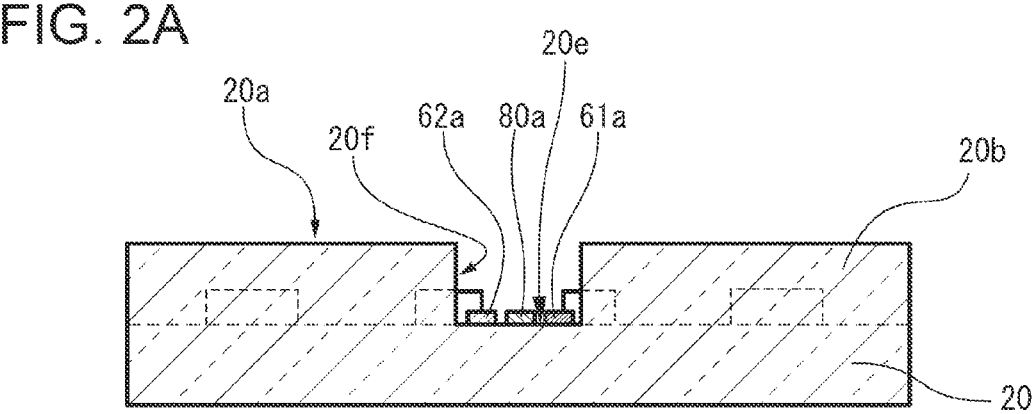
FIG. 2A is a cross-sectional view taken along the line B-B' of FIG. 1C.

In the second substrate 20, as shown in FIG. 2A that is a cross-sectional view taken along the line B-B' of FIG. 1C, a cutout portion 20f is provided in a part of the support portion 20b in order to form a region where connection wires 61a, 62a, and 80a and connection electrodes 61b and 62b are disposed, thereby forming the electrode forming surface 20e. In the second driving electrode 60, the second driving inside electrode 61 is electrically connected to the connection electrode 61b through the connection wire 61a disposed via the electrode forming surface 20e of the cutout portion 20f, and the second driving outside electrode 62 is electrically connected to the connection electrode 62b through the connection wire 62a disposed via the electrode forming surface 20e of the cutout portion 20f. In addition, as shown in the drawings, the connection electrodes 51b and 52b of the first driving electrode 50 and the connection electrodes 61b and 62b of the second driving electrode 60 are disposed on the outer edge side of the substrate in opposite directions when viewed from the direction of the arrow A.

In addition, ground connection electrodes 70 and 80 connected to a ground unit (not shown) are formed on the first and second optical films 30 and 40. The first ground connection electrode 70 is electrically connected to a ground electrode 70b through a ground wire 70a electrically connected to the first optical film 30, and the ground electrode 70b is connected to the ground unit (not shown). As a result, the first optical film 30 is electrically grounded. Similarly, the second ground connection electrode 80 is electrically connected to the second optical film 40 and is electrically connected to a ground electrode 80b through the ground wire 80a disposed via the electrode forming surface 20e of cutout portion 20f, and the ground electrode 80b is connected to the ground unit (not shown). As a result, the second optical film 40 is electrically grounded. Thus, by grounding the optical films 30 and 40 to release the electric charge accumulated on the optical films 30 and 40 to the ground, it is possible to remove the electric charge that is a cause of degrading the driving accuracy of the optical films 30 and 40.

Figure 2B:
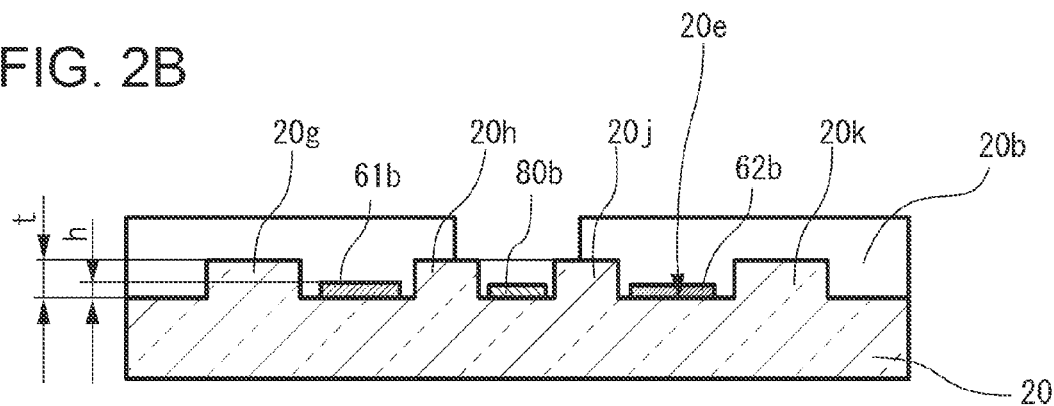
FIG. 2B is a cross-sectional view taken along the line C-C' of FIG. 1C.

FIG. 2B is a cross-sectional view taken along the line C-C' of FIG. 1C. As shown in FIG. 2B, in a region of the second substrate 20 where the connection electrodes 61b and 62b and the ground electrode 80b on the electrode forming surface 20e are formed, protruding portions 20g, 20h, 20j, and 20k that protrude from the electrode forming surface 20e as shown in FIG. 2B are arrayed and formed in a direction crossing the extending direction of the connection electrodes 61b and 62b and the ground electrode 80b, that is, in a direction along the line C-C' of FIG. 1C, so as to interpose the connection electrodes 61b and 62b and the ground electrode 80b therebetween when viewed from the direction of the arrow A. The protruding amount t of the protruding portions 20g, 20h, 20j, and 20k from the electrode forming surface 20e is larger than the thickness h of at least the connection electrodes 61b and 62b and the ground electrode 80b, that is, t>h.

Figure 2C:
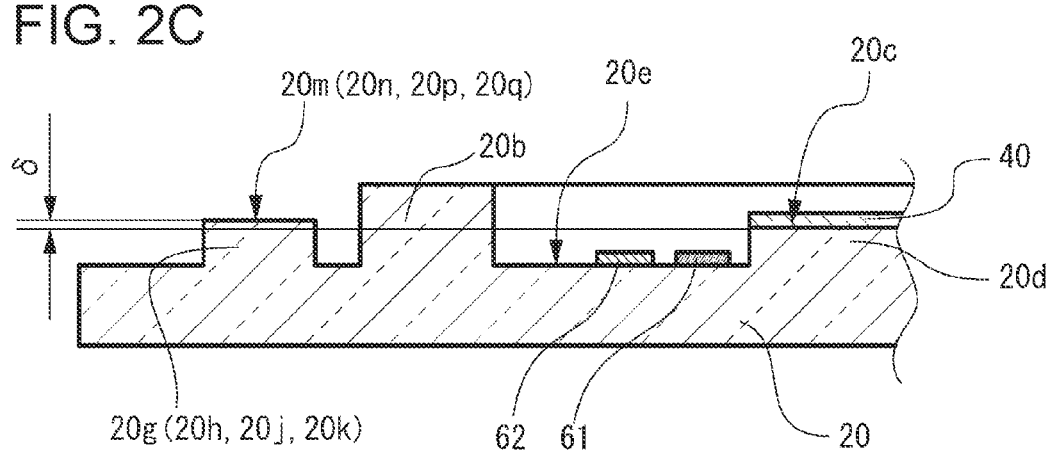
FIG. 2C is a cross-sectional view taken along the line D-D' of FIG. 1C.

In addition, as shown in FIG. 2C that is a cross-sectional view taken along the line D-D' of FIG. 1C, it is preferable that a top surface 20m of the protruding portion 20g be within approximately the same plane as the second mirror forming surface 20c. That is, it is preferable that the surface height difference δ be δ≅0. Similarly, it is preferable that a top surface 20n of the protruding portion 20h, a top surface 20p of the protruding portion 20j, and a top surface 20q of the protruding portion 20k be within approximately the same plane as the second mirror forming surface 20c. As will be described in detail later, the protruding portions 20g, 20h, 20j, and 20k can be formed without increasing the number of surface forming steps in substrate manufacturing by forming the top surfaces 20m, 20n, 20p, and 20q of the protruding portions 20g, 20h, 20j, and 20k within approximately the same plane as the second mirror forming surface 20c. As a result, it is possible to suppress an increase in manufacturing cost.

In the etalon filter 100, an electrostatic attraction is generated between the first and second driving electrodes 50 and 60 by applying a voltage to the first and second driving electrodes 50 and 60. By the generated electrostatic attraction, the first optical film 30 of the first substrate 10 having the thin diaphragm portion 10c is moved to the second optical film 40 side. Thus, by changing a distance between the first and second optical films 30 and 40, that is, a gap between the first and second optical films 30 and 40 using the first substrate 10 as a driving substrate and the second substrate 20 as a fixed substrate, light having a desired wavelength can be transmitted through the first and second optical films 30 and 40 of the etalon filter 100.

Second Embodiment

Figure 3A:
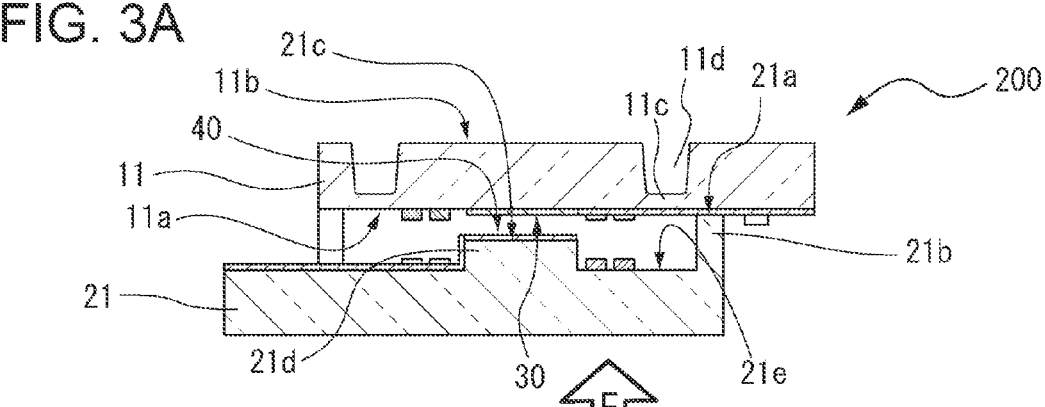
FIG. 3A is a schematic cross-sectional view of a wavelength tunable interference filter according to a second embodiment.
Figure 3B:
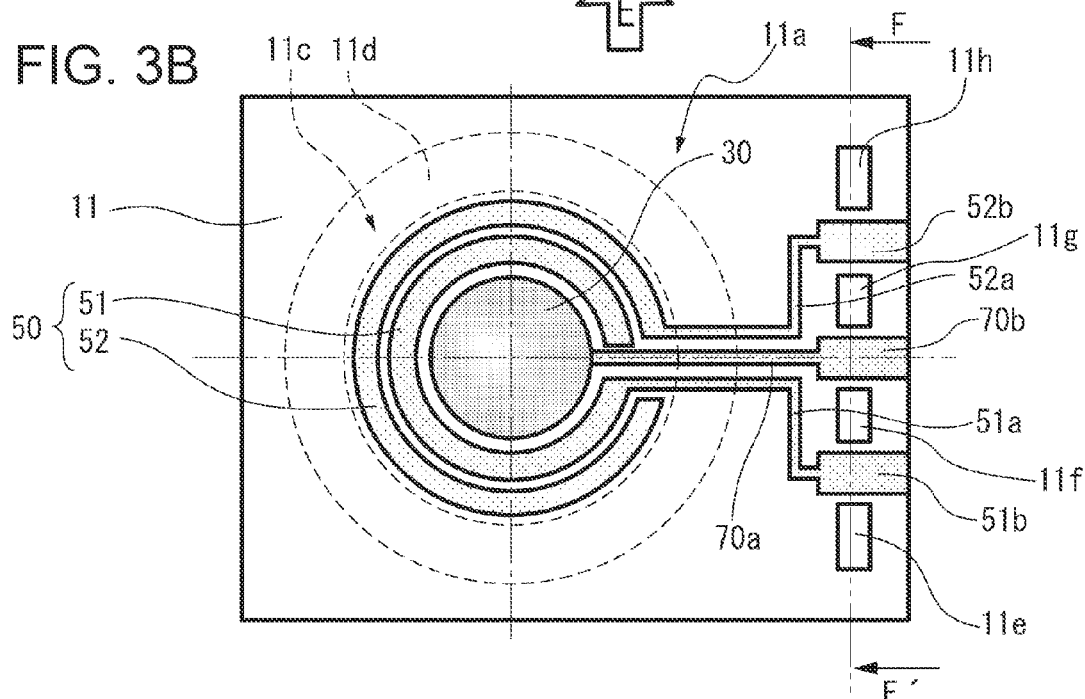
FIG. 3B is a plan view of a first substrate when viewed from the direction of the arrow E shown in FIG. 3A.
Figure 3C:
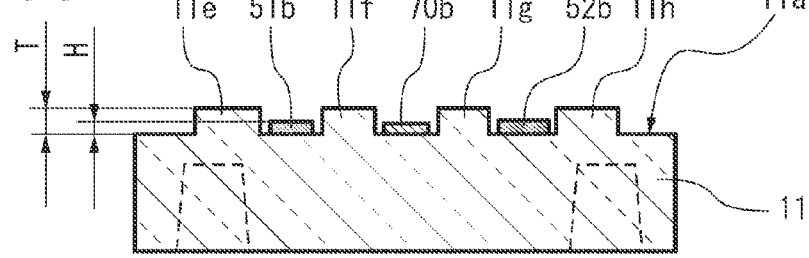
FIG. 3C is a cross-sectional view taken along the line F-F' of FIG. 3B.

FIG. 3A is a schematic cross-sectional view showing an etalon filter 200 according to a second embodiment, FIG. 3B is a plan view of a first substrate 11 when viewed from the direction of the arrow E shown in FIG. 3A, and FIG. 3C is a cross-sectional view taken along the line F-F' of FIG. 3B. The etalon filter 200 according to the second embodiment is different from the etalon filter 100 according to the first embodiment in that the protruding portions 20g, 20h, 20j, and 20k provided on the second substrate 20 of the etalon filter 100 are disposed on the first substrate 11. Therefore, in the etalon filter 200 according to the second embodiment, the same components as in the etalon filter 100 according to the first embodiment are denoted by the same reference numerals, and explanation thereof will be omitted.

As shown in FIG. 3A, the etalon filter 200 is configured to include a first substrate 11 and a second substrate 21 including a support portion 21b that has a bonding surface 21a, which is bonded to the first substrate 11, on the end surface. As shown in FIG. 3B, on a first mirror forming surface 11a of the first substrate 11, a first optical film 30 is formed, and a first driving electrode 50 formed by a first driving inside electrode 51 and a first driving outside electrode 52 is formed outside the first optical film 30. In addition, on the first mirror forming surface 11a of the first substrate 11, a connection wire 51a and a connection electrode 51b that are electrically connected to the first driving inside electrode 51 are formed, and a connection wire 52a and a connection electrode 52b that are electrically connected to the first driving outside electrode 52 are formed. In addition, a ground wire 70a and a ground electrode 70b that are electrically connected to the first optical film 30 are formed on the first mirror forming surface 11a of the first substrate 11.

On the first mirror forming surface 11a, protruding portions 11e, 11f, 11g, and 11h arrayed in a direction crossing the extending direction of the connection electrodes 51b and 52b and the ground electrode 70b, that is, in a direction along the line F-F' of FIG. 3B, are formed outside a region supported by the support portion 21b of the second substrate 21. As shown in FIG. 3C that is a cross-sectional view taken along the line F-F' of FIG. 3B, the protruding amount T of the protruding portions 11e, 11f, 11g, and 11h from the first mirror forming surface 11a is larger than the thickness H of at least the connection electrodes 51b and 52b and the ground electrode 70b, that is, T>H.

In the etalon filter 100 or the etalon filter 200 described above, only protruding portions outside both ends of the connection electrodes, that is, only the protruding portions 20g and 20k of the protruding portions 20g, 20h, 20j, and 20k of the second substrate 20 or only the protruding portions 11e and 11h of the protruding portions 11e, 11f, 11g, and 11h of the first substrate 10 may be disposed. Alternatively, only protruding portions between the connection electrodes, that is, the protruding portions 20h and 29j or the protruding portions 11f and 11g may be disposed.

Third Embodiment

Figure 4:
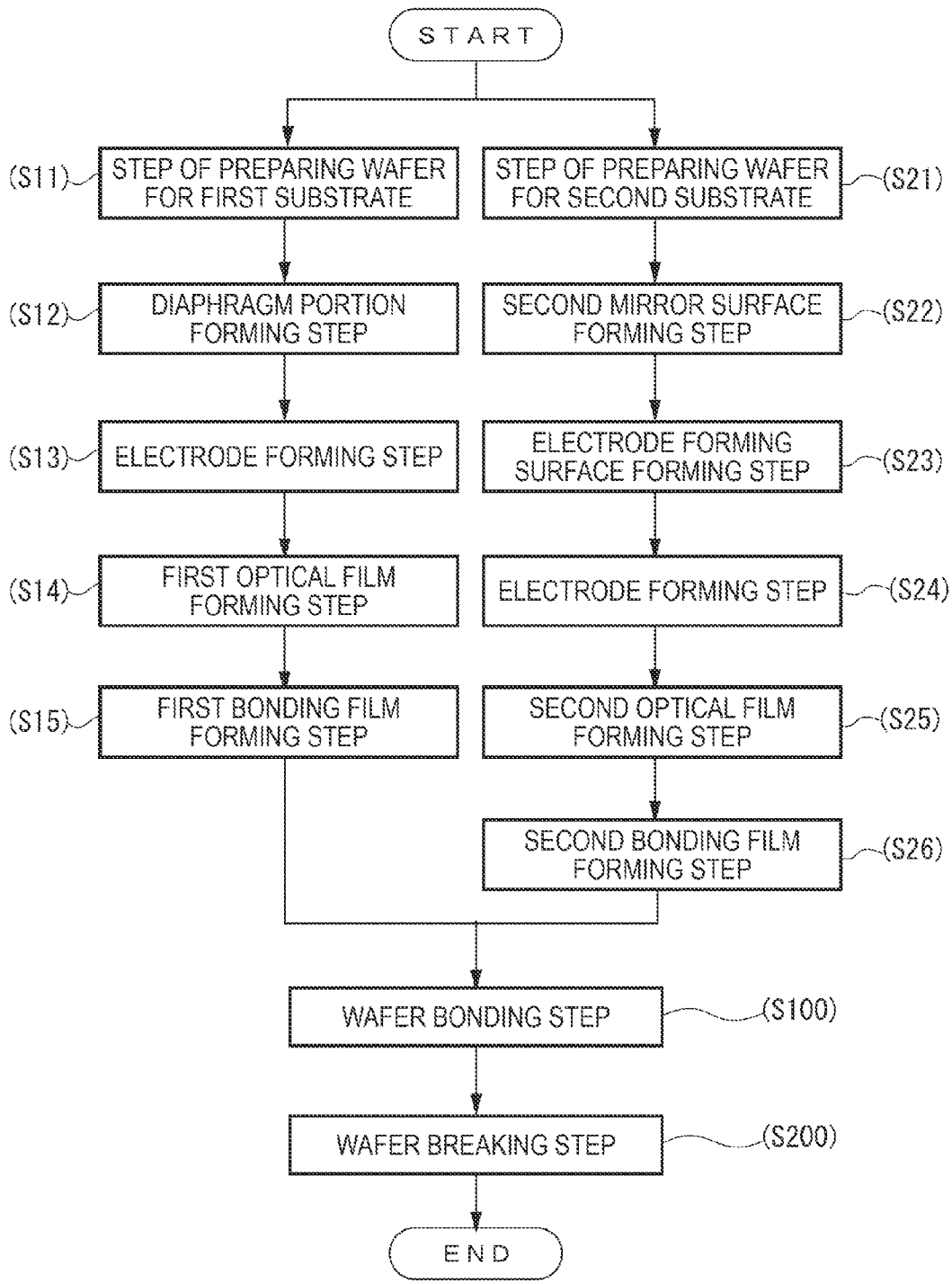
FIG. 4 is a flowchart showing a method of manufacturing a wavelength tunable interference filter according to a third embodiment.
Figure 5A:
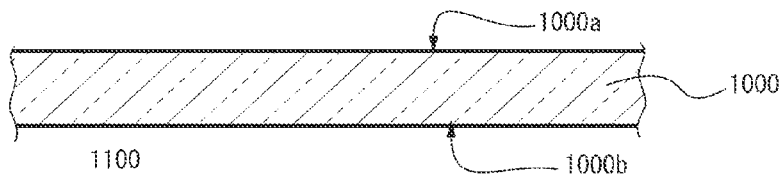
FIGS. 5A to 5F are cross-sectional views showing a method of manufacturing a first substrate of the wavelength tunable interference filter according to the third embodiment.
Figure 5B:
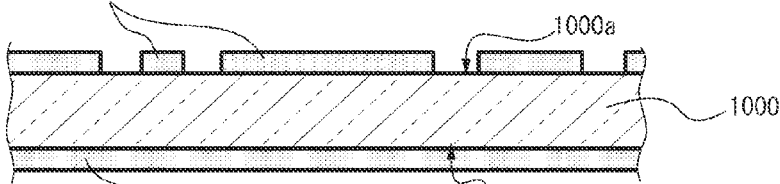
Figure 5C:
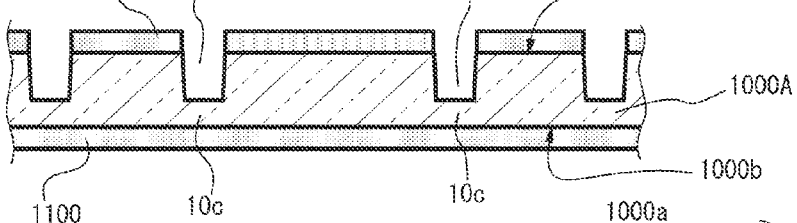
Figure 5D:
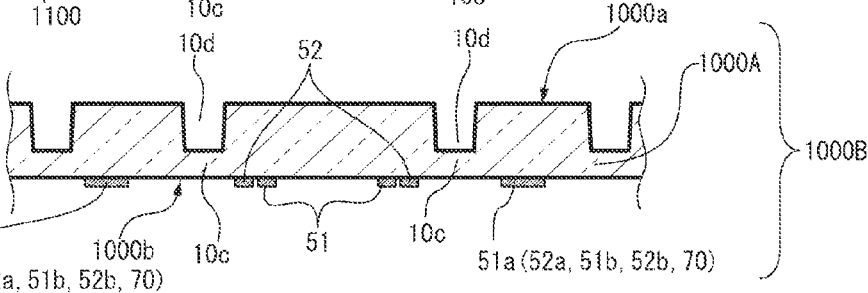

FIG. 4 is a flowchart showing a method of manufacturing the etalon filter 100 according to a third embodiment. First, the first substrate 10 will be described.
First Wafer Manufacturing Process The first wafer manufacturing process is a process of forming a collection of a plurality of first substrates 10 on a wafer of a substrate material, and includes the following steps.
Step of Preparing a Wafer for a First Substrate First, in a step of preparing a wafer for a first substrate (S11), a first wafer 1000 of a substrate material shown in a cross-sectional view of FIG. 5A, which has a predetermined thickness and of which both surfaces 1000a and 1000b have been mirror-polished flat, is prepared, and pretreatment including predetermined washing and the like is performed.
Diaphragm Portion Forming Step For the prepared first wafer 1000, the process proceeds to a diaphragm portion forming step (S12). In the diaphragm portion forming step (S12), as shown in FIG. 5B, an etching resist 1100 from which the width of the circumferential groove 10d (refer to FIGS. 1A and 1B) has been removed is first formed on the surface 1000a that forms the circumferential groove 10d. In addition, as shown in FIG. 5C, the circumferential groove 10d is formed by predetermined etching. When the circumferential groove 10d is formed and the etching ends, the etching resist 1100 is removed from the first wafer 1000. As a result, a first substrate wafer 1000A is obtained.
Electrode Forming Step Then, the process proceeds to an electrode forming step (S13). In the electrode forming step (S13), as shown in FIG. 5D, the first driving electrode 50 and the first ground connection electrode 70 are formed on the surface 1000b that becomes the first mirror forming surface 10a, thereby obtaining a first substrate wafer 1000B. The first driving inside electrode 51 and the first driving outside electrode 52 that form the first driving electrode 50, the connection wires 51a and 52a, the connection electrodes 51b and 52b, and the first ground connection electrode 70 can be formed by forming an indium tin oxide (ITO) film using a sputtering method, patterning an electrode forming region with a resist material, and removing the ITO film excluding the electrode forming region by etching.

First Optical Film Forming Step

Figure 5E:
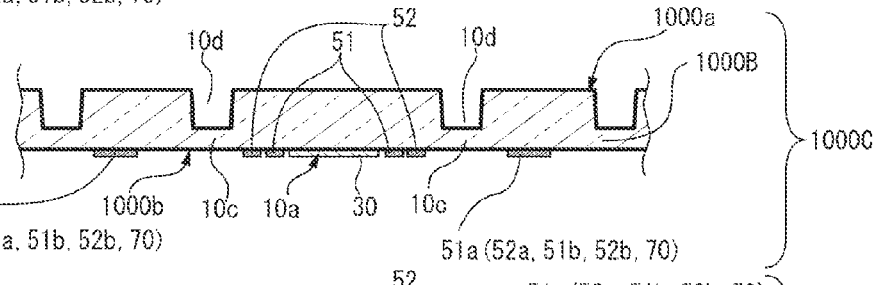

Then, the process proceeds to a first optical film forming step (S14). In the first optical film forming step (S14), as shown in FIG. 5E, the first optical film 30 is formed on the first mirror forming surface 10a on the inner side of the first driving inside electrode 51. As the first optical film 30, for example, a metal film such as Ag, a conductive alloy film such as an Ag alloy, or a dielectric multilayer film, which is formed by laminating alternately $TiO_2$ as a high refractive index layer and $SiO_2$ as a low refractive index layer, is formed. Then, the first optical film 30 is formed by masking the formation region of the first optical film 30 by resist material patterning and removing a coat excluding the first optical film 30 by etching.

First Bonding Film Forming Step

Figure 5F:
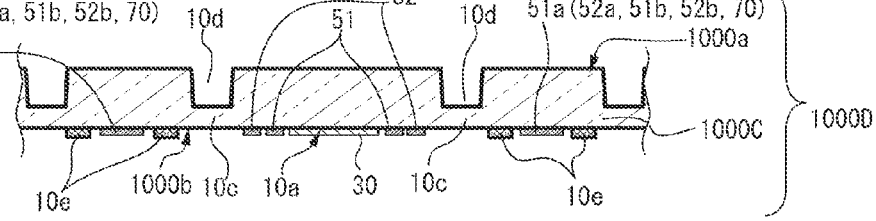

Then, the process proceeds to a first bonding film forming step (S15) for bonding to the second substrate 20. As shown in FIG. 5F, a first bonding film 10e is formed in a region, which is bonded to the support portion 20b of the second substrate 20, of the substrate surface 1000b that becomes a first mirror forming surface 10a of a first substrate wafer 1000C. For example, the first bonding film 10e can be formed by forming a plasma-polymerized film, which contains a Si skeleton having siloxane bonds and a leaving group bonded to the Si skeleton, in a predetermined thickness using a plasma CVD method, masking a bonding region by resist material patterning, and removing a bonding film excluding the bonding region by etching. A first substrate wafer 1000D as a collection of first substrates 10 is obtained by the first bonding film forming step (S15), and the process proceeds to the following wafer bonding step.

Second Wafer Manufacturing Process

Next, a second substrate wafer manufacturing method up to a wafer bonding step of the second substrate 20 will be described. The second wafer manufacturing process as a process of forming a collection of second substrates 20 includes the following steps.

Step of Preparing a Wafer for a Second Substrate

Figure 6A:
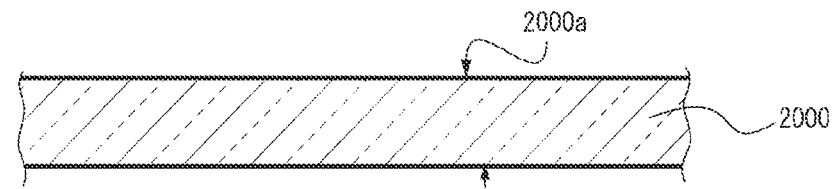
FIGS. 6A to 6E are cross-sectional views showing a method of manufacturing a second substrate of the wavelength tunable interference filter according to the third embodiment.

First, in a step of preparing a wafer for a second substrate (S21), a second wafer 2000 of a substrate material shown in a cross-sectional view of FIG. 6A, which has a predetermined thickness and of which both surfaces 2000a and 2000b have been mirror-polished flat, is prepared, and purification processing, such as predetermined washing, is performed.

Second Mirror Surface Forming Step

Figure 6B:
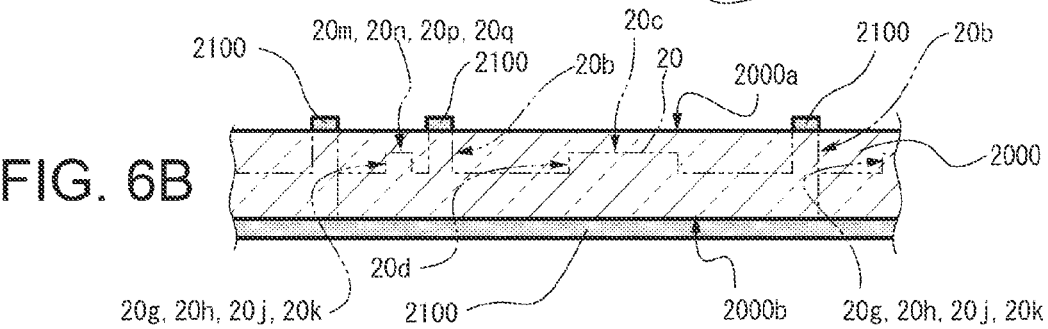

For the prepared second wafer 2000, the process proceeds to a second mirror surface forming step (S22). First, as shown in FIG. 6B, a region, which becomes the support portion 20b (refer to FIG. 1A) of the second substrate 20, of one surface 2000a of the second wafer 2000 is masked by patterning of an etching resist 2100. In addition, for convenience of explanation, the shape of the second substrate 20 is indicated by two-dot chain line.

Figure 6C:
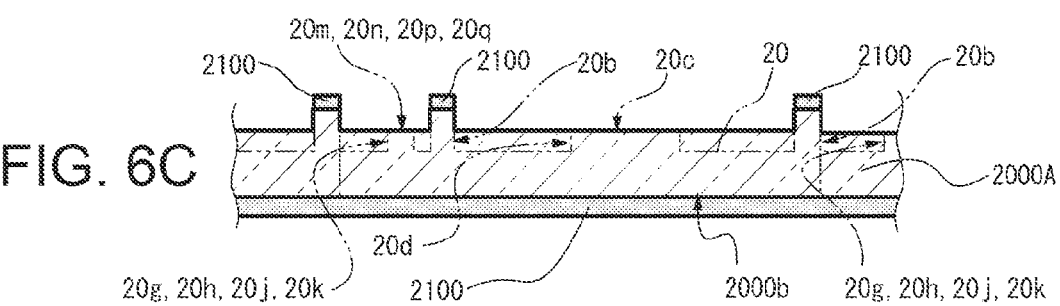

A base material of the second wafer 2000 patterned by the etching resist 2100 is removed up to the second mirror forming surface 20c of the second mirror forming portion 20d by etching as shown in FIG. 6C, thereby obtaining a second substrate wafer 2000A. Although the second mirror forming surface 20c is formed by the second mirror surface forming step (S22), it is preferable that the top surfaces 20m, 20n, 20p, and 20q of the protruding portions 20g, 20h, 20h, and 20k be formed together with the second mirror forming surface 20c.

Electrode Forming Surface Forming Step

Figure 6D:
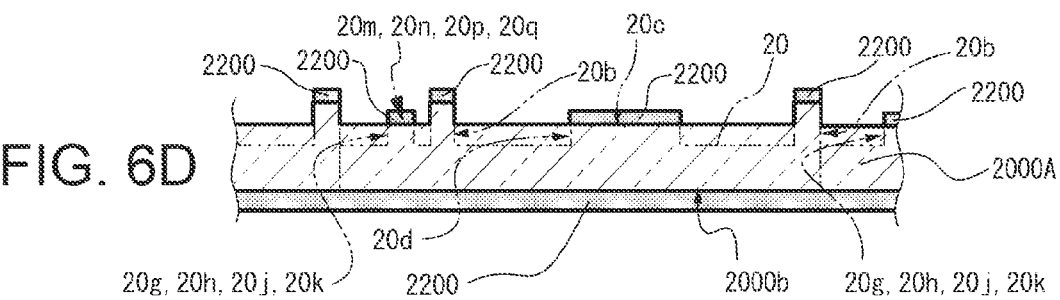
Figure 6E:
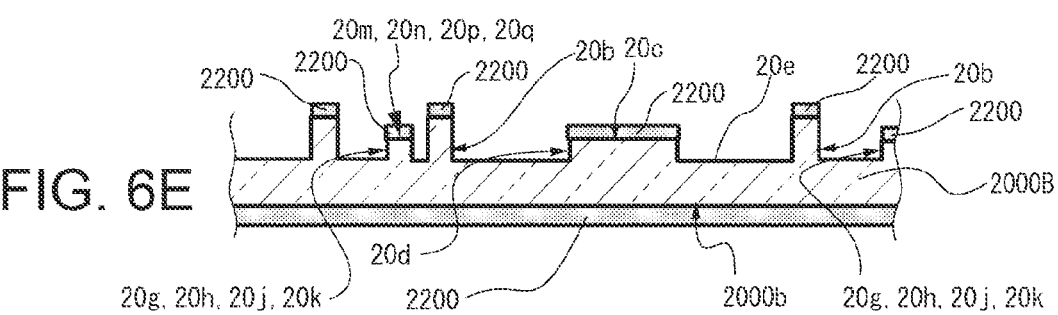

For the second substrate wafer 2000A obtained by the second mirror surface forming step (S22), the process proceeds to an electrode forming surface forming step (S23) of forming an electrode forming surface. In the electrode forming surface forming step (S23), as shown in FIG. 6D, regions of the support portion 20b, the second mirror forming portion 20d, and the protruding portions 20g, 20h, 20j, and 20k in the second substrate wafer 2000A obtained by the second mirror surface forming step (S22) are masked by patterning of an etching resist 2200. Then, a second substrate wafer 2000B in which the electrode forming surface 20e is formed, which is shown in FIG. 6E, is formed by etching the masked second substrate wafer 2000A.

Electrode Forming Step

The etching resist 2200 is removed from the second substrate wafer 2000B obtained by the electrode forming surface forming step (S23), and the process proceeds to an electrode forming step (S24). In the electrode forming step (S24), as shown in FIG. 7A, the second driving electrode 60 and the second ground connection electrode 80 are formed on the electrode forming surface 20e, thereby obtaining a second substrate wafer 2000C. The second driving inside electrode 61 and the second driving outside electrode 62 that form the second driving electrode 60, the connection wires 61a and 62a, the connection electrodes 61b and 62b, and the second ground connection electrode 80 can be formed by forming an indium tin oxide (ITO) film using a sputtering method, patterning an electrode forming region with a resist material, and removing the ITO film excluding the electrode forming region by etching.

Second Optical Film Forming Step

Then, the process proceeds to a second optical film forming step (S25). In the second optical film forming step (S25), as shown in FIG. 7B, the second optical film 40 is formed on the second mirror forming surface 20c. As the second optical film 40, for example, a metal film such as Ag, a conductive alloy film such as an Ag alloy, or a dielectric multilayer film, which is formed by laminating alternately $TiO_2$ as a high refractive index layer and $SiO_2$ as a low refractive index layer, is formed. Then, the second optical film 40 is formed by masking the formation region of the first optical film 40 by resist material patterning and removing a coat excluding the second optical film 40 by etching.

Second Bonding Film Forming Step

Then, the process proceeds to a second bonding film forming step (S26) for bonding to the first substrate 10. As shown in FIG. 7C, a second bonding film 20r is formed on a bonding surface 20a of a support portion 20b of a second substrate wafer 2000D. Similar to the first bonding film 10e, for example, the second bonding film 20r can be formed by forming a plasma-polymerized film, which contains a Si skeleton having siloxane bonds and a leaving group bonded to the Si skeleton, in a predetermined thickness using a plasma CVD method, masking the bonding surface 20a by resist material patterning, and removing a bonding film excluding the bonding surface 20a by etching.

By the second bonding film forming step (S26), a second substrate wafer 2000E as a collection of second substrates 20 is obtained. Then, for the second substrate wafer 2000E and the first substrate wafer 1000D obtained through the first bonding film forming step (S15), the process proceeds to the following wafer bonding step.

Wafer Bonding Step

In a wafer bonding step (S100), a filter body 3000 that is a collection of etalon filters 100 is formed by bonding the first and second substrate wafers 1000D and 2000E to each other. In the wafer bonding step (S100), as shown in FIG. 8A, the first and second substrate wafers 1000D and 2000E are bonded to each other by activating the first bonding film 10e of the first substrate wafer 1000D and the second bonding film 20r of the second substrate wafer 2000E by $O_2$ plasma treatment or ultraviolet (UV) irradiation processing and pressing the first and second substrate wafers 1000D and 2000E against each other in a state where the first and second bonding films 10e and 20r face each other. As a result, the filter body 3000 can be obtained.

Wafer Breaking Step

The process proceeds to a wafer breaking step (S200) of obtaining the individual etalon filters 100 from the filter body 3000 obtained by the wafer bonding step (S100). In the wafer breaking step (S200), since electrode wires, such as connection electrodes, are formed at positions cut into individual pieces, there is a possibility that an electrode wiring portion overlapping a cut portion in plan view will be cut simultaneously with the cut portion for example, in dicing that is a cutting method using a grindstone or in cutting using a laser. For this reason, it is preferable to separate the filter body 3000 into individual pieces by breaking after scribing.

As shown in FIG. 8B, a scribe 3000a along a cut portion on the outer surface 1000a side of the first substrate wafer 1000D of the filter body 3000 and a scribe 3000b along a cut portion on the outer surface 2000b side of the second substrate wafer 2000E are formed first.

Then, as shown in FIG. 8C, the second substrate wafer 2000E is supported by a support unit (not shown) at a position P1 corresponding to the scribe 3000a of the first substrate wafer 1000D, and a load J1 is applied to the first substrate wafer 1000D side to proceed with the scribe 3000a. Accordingly, a breaking portion 3100 is formed on the first substrate wafer 1000D. Then, as shown in FIG. 8D, the first substrate wafer 1000D is supported by a support unit (not shown) at a position P2 corresponding to the scribe 3000b of the second substrate wafer 2000E, and a load J2 is applied to the second substrate wafer 2000E side to proceed with the scribe 3000b. Accordingly, a breaking portion 3200 is formed on the second substrate wafer 2000E. As a result, individual pieces of the etalon filters 100 can be obtained from the filter body 3000.

Figure 9A:
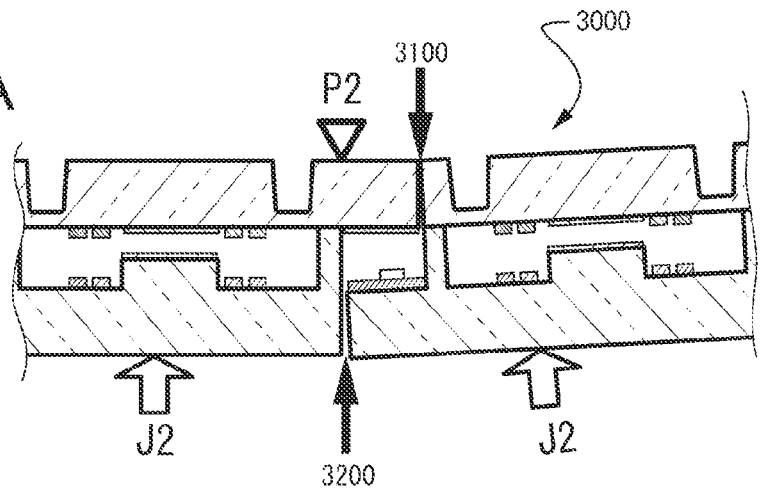
FIGS. 9A and 9B are schematic diagrams illustrating the behavior of the wavelength tunable interference filter according to the third embodiment at the time of breaking.
Figure 9B:
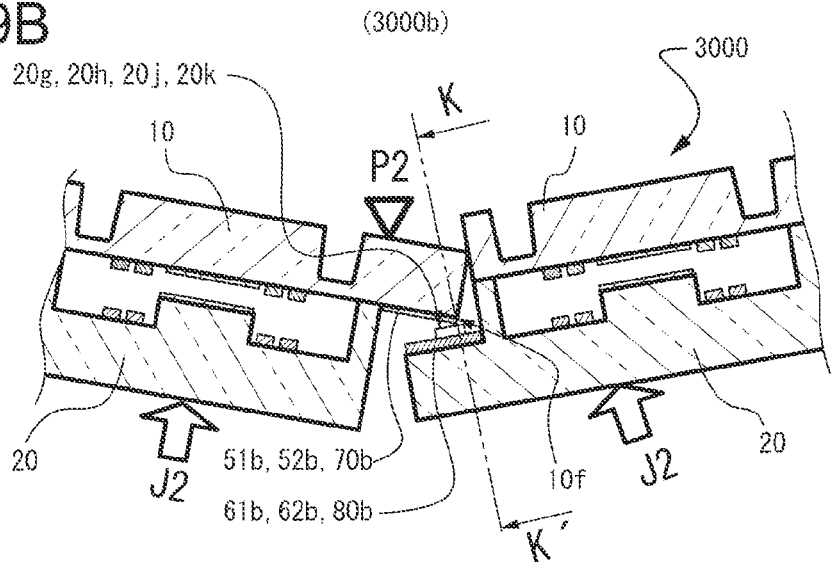
Figure 9C:
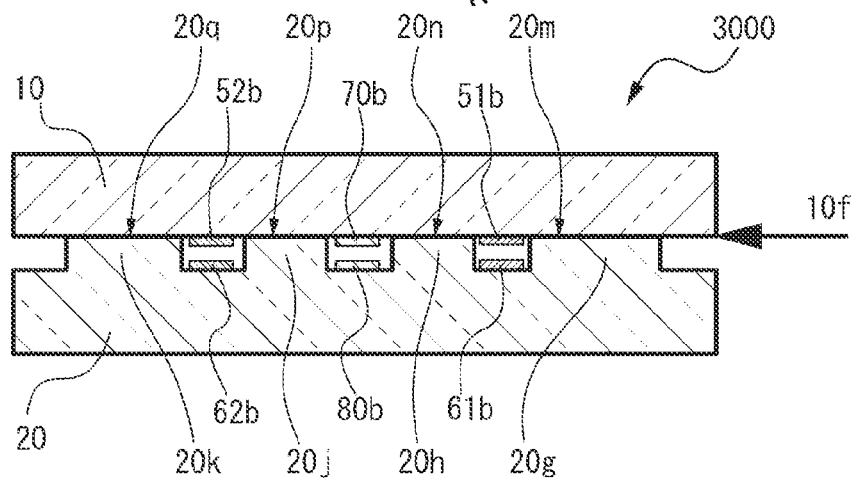
FIG. 9C is a cross-sectional view taken along the line G-G' of FIG. 9B.

FIGS. 9A and 9B show the behavior of a substrate at the time of breaking along the scribe 3000b shown in FIG. 8D. First, as shown in FIG. 9A, a breaking portion 3200 is formed by proceeding with the scribe 3000b, and adjacent substrates are separated from each other. Then, as shown in FIG. 9B, when the load J2 is applied, the filter body 3000 is further bent, and an end 10f of the first mirror forming surface 10a of the first substrate 10 on which the connection electrodes 51b and 52b and the ground electrode 70b are formed is brought close to the connection electrodes 61b and 62b and the ground electrode 80b, which are formed on the electrode forming surface 20e of the second substrate 20, so as to collide therewith. However, due to the protruding portions 20g, 20h, 20j, and 20k that are formed on the second substrate 20 and have a larger protruding amount than the thickness of the connection electrodes 61b and 62b and the ground electrode 80b, it is possible to prevent the end 10f of the first substrate 10 from reaching the connection electrodes 61b and 62b and the ground electrode 80b of the second substrate 20 as shown in FIG. 9C that is a cross-sectional view taken along the line K-K' of FIG. 9B. Thus, when breaking the filter body 3000, it is possible to prevent damage to or breakage of the connection electrodes 61b and 62b and the ground electrode 80b of the second substrate 20 due to the contact of the end of the first substrate 10. As a result, it is possible to suppress the occurrence of the etalon filter 100 that becomes a defective product.

Fourth Embodiment

Figure 10:
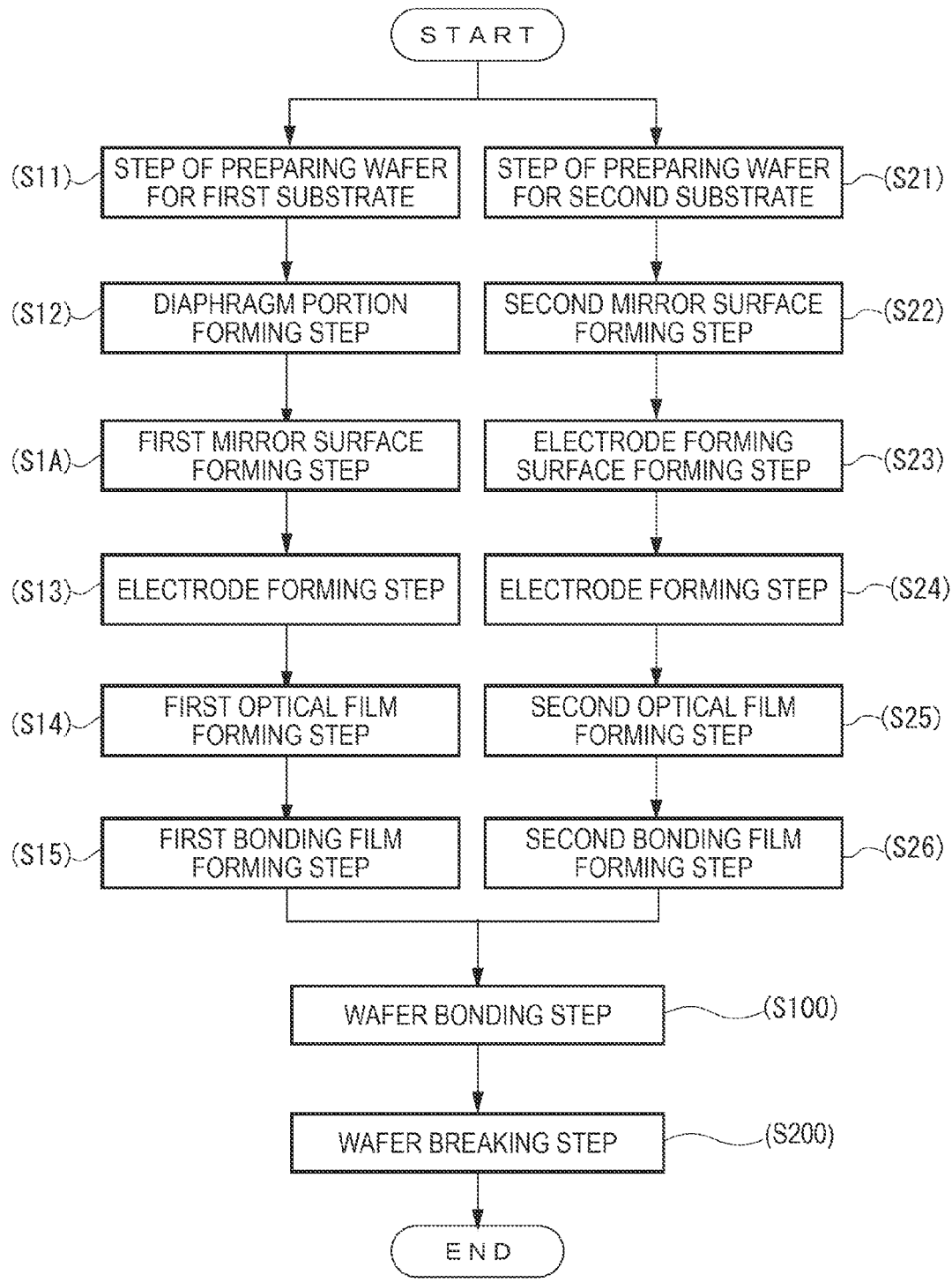
FIG. 10 is a flowchart showing a method of manufacturing a wavelength tunable interference filter according to a fourth embodiment.

As a fourth embodiment, a method of manufacturing the etalon filter 200 according to the second embodiment will be described. FIG. 10 is a flowchart showing a method of manufacturing the etalon filter 200 according to the fourth embodiment. The method of manufacturing the etalon filter 200 according to the fourth embodiment is different from the method of manufacturing the etalon filter 100 according to the third embodiment in that a first mirror surface forming step of forming the first mirror forming surface 11a is included. Therefore, the same steps as in the method of manufacturing the etalon filter 100 according to the third embodiment are denoted by the same reference numerals, and explanation thereof will be omitted.

First Mirror Surface Forming Step

Figure 11A:
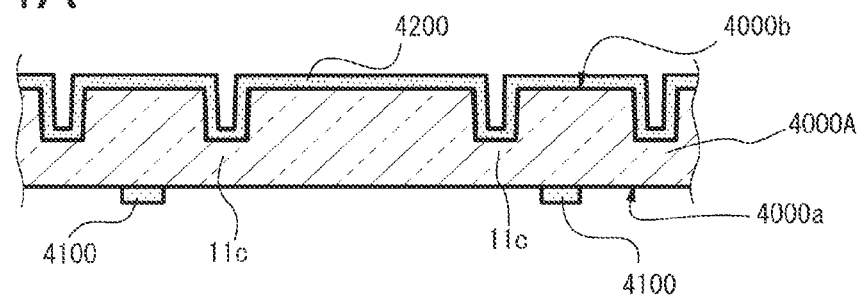
FIGS. 11A to 11C are cross-sectional views showing a method of manufacturing a first substrate of the wavelength tunable interference filter according to the fourth embodiment.
Figure 11B:
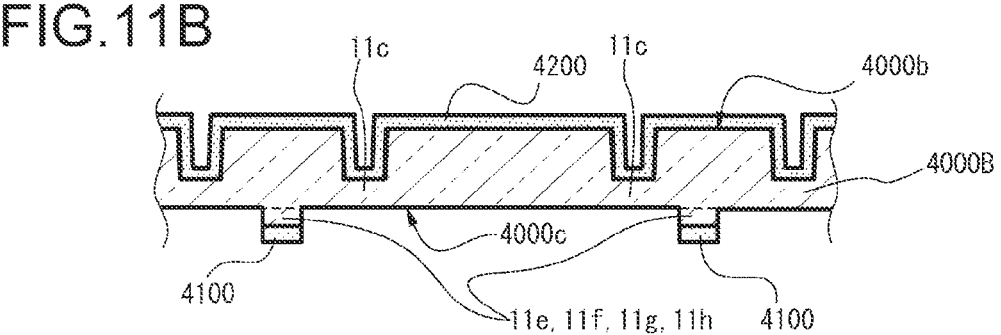
Figure 11C:
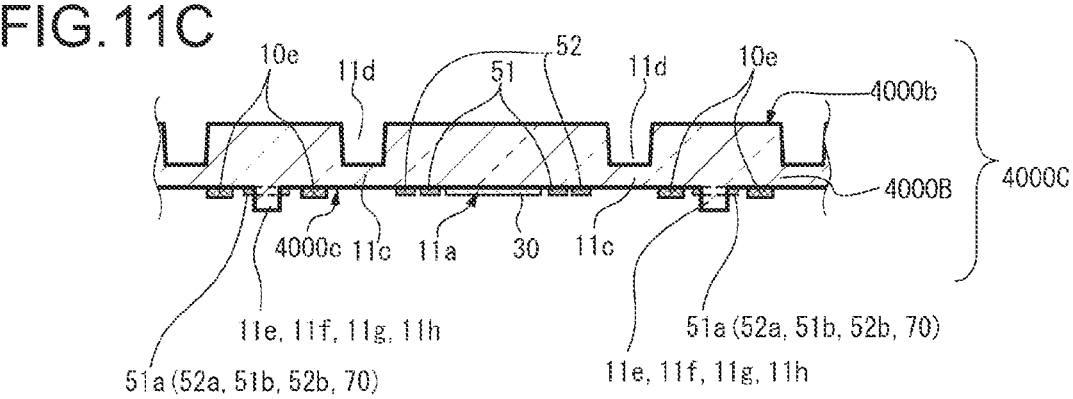

As shown in FIG. 10, in the method of manufacturing the etalon filter 200, a first mirror surface forming step (S1A) is included. As shown in FIG. 11A, in the first mirror surface forming step (S1A), in a first substrate wafer 4000A formed through the diaphragm portion forming step (S12), an etching resist 4100 is patterned in the formation region of the protruding portions 11e, 11f, 11g, and 11h (refer to FIGS. 3B and 3C) on a substrate surface 4000a on which the first mirror forming surface 11a is formed, and a substrate surface 4000b opposite the substrate surface 4000a is coated by an etching resist 4200. Then, the first substrate wafer 4000A coated with the etching resists 4100 and 4200 is etched, thereby obtaining a first substrate wafer 4000B in which a first substrate wafer mirror forming surface 4000c, which becomes the first mirror forming surface 11a, and the protruding portions 11e, 11f, 11g, and 11h are formed.

Then, by performing an electrode forming step (S13), a first optical film forming step (S14), and a first bonding film forming step (S15) on the first substrate wafer 4000B, a first substrate wafer 4000C is formed. Then, the process proceeds to a wafer bonding step (S100). Then, the process proceeds to a wafer breaking step.

Wafer Breaking Step

Figure 12A:
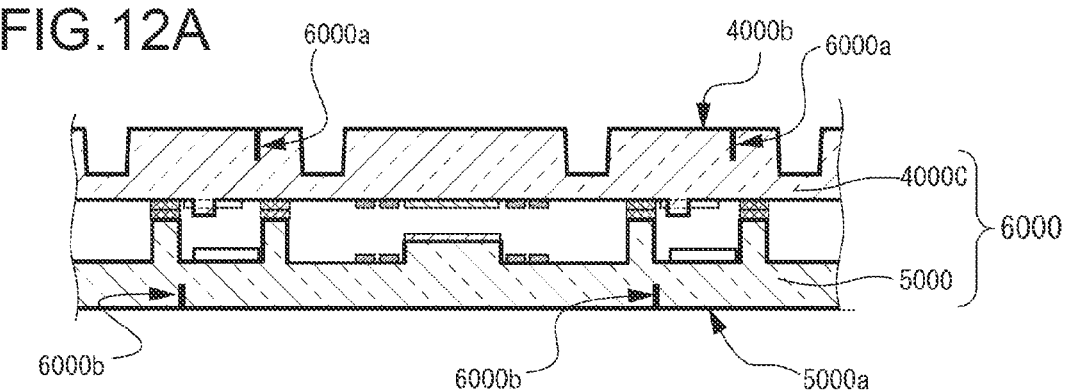
FIGS. 12A to 12C are cross-sectional views showing a method of manufacturing the wavelength tunable interference filter according to the fourth embodiment.
Figure 12B:
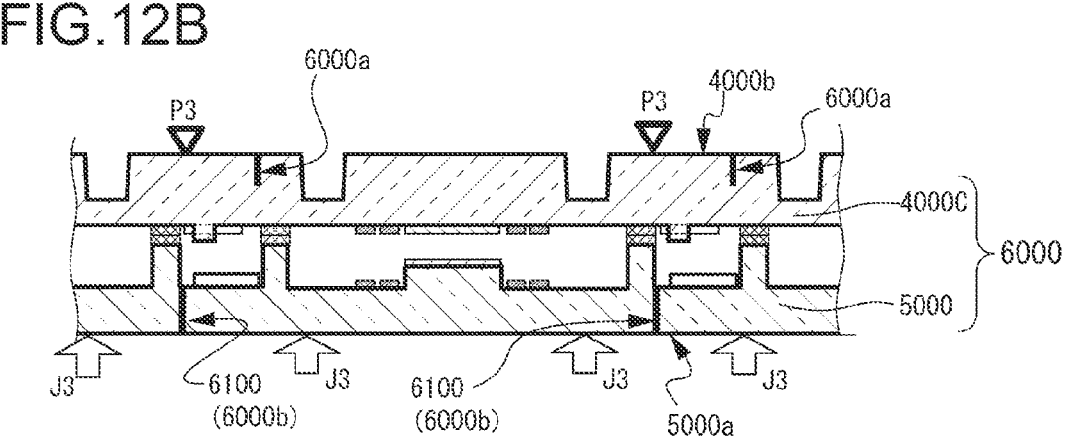
Figure 12C:
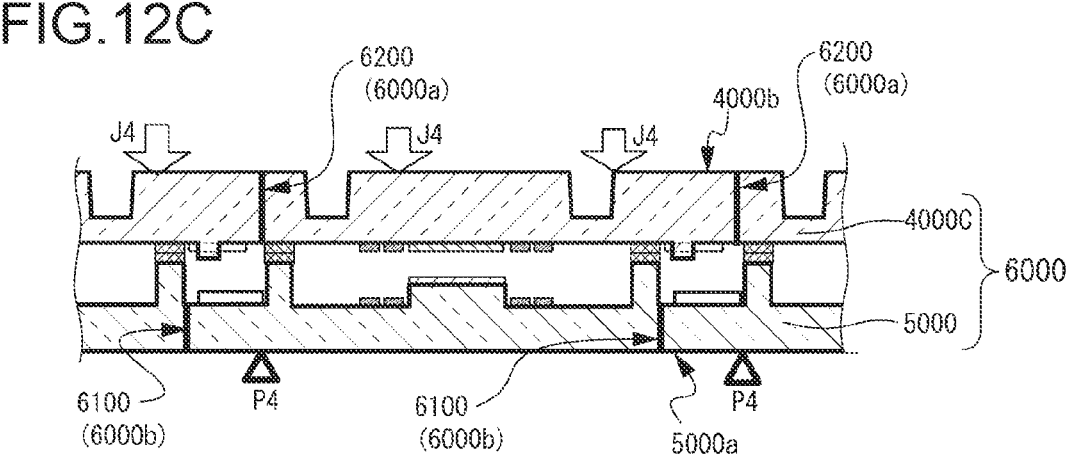

As shown in FIG. 12A, in a wafer breaking step (S20A) in the fourth embodiment, for a filter body 6000 in which the first substrate wafer 4000C and a second substrate wafer 5000 as a collection of second substrates 21 are bonded to each other, a scribe 6000a along a cut portion on the outer surface 4000b side of the first substrate wafer 4000C and a scribe 6000b along a cut portion on the outer surface 5000a side of the second substrate wafer 5000 are formed. Then, as shown in FIG. 12B, the first substrate wafer 4000C is supported by a support unit (not shown) at a position P3 corresponding to the scribe 6000b of the second substrate wafer 5000, and a load J3 is applied to the second substrate wafer 5000 side to proceed with the scribe 6000b. As a result, a breaking portion 6100 is formed on the second substrate wafer 5000. Then, as shown in FIG. 12C, the second substrate wafer 5000 is supported by a support unit (not shown) at a position P4 corresponding to the scribe 6000a of the first substrate wafer 4000C, and a load J4 is applied to the first substrate wafer 4000C side to proceed with the scribe 6000a. Accordingly, a breaking portion 6200 is formed on the first substrate wafer 4000C. As a result, individual pieces of the etalon filters 200 can be obtained from the filter body 6000.

Figure 13:
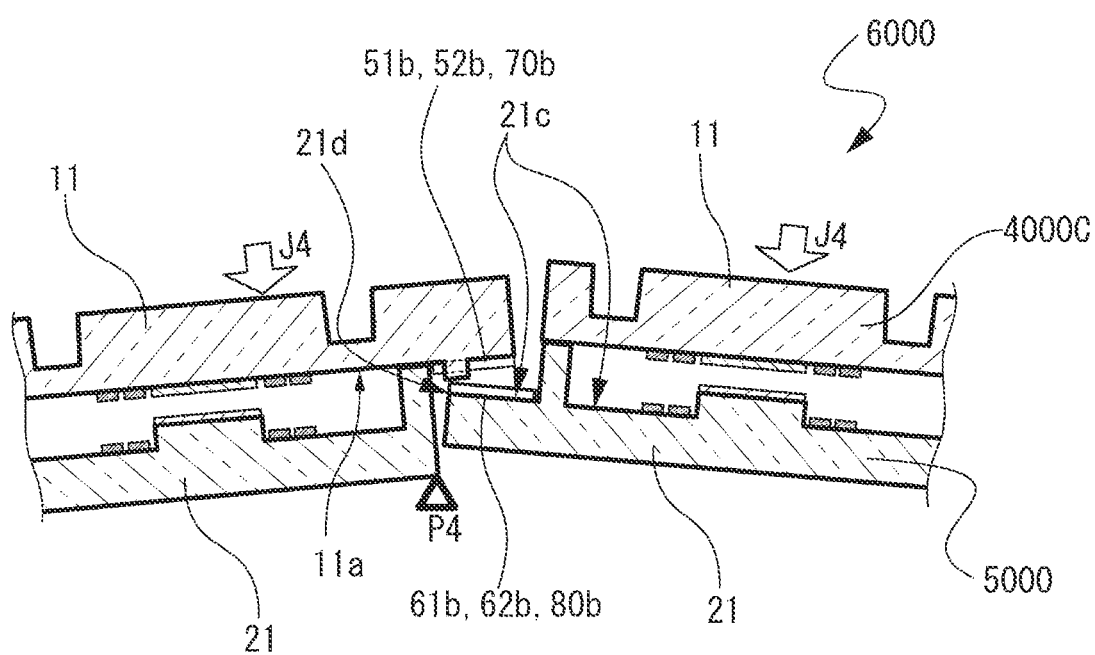
FIG. 13 is a schematic diagram illustrating the behavior of the wavelength tunable interference filter according to the fourth embodiment at the time of breaking.

Thus, the method of manufacturing the etalon filter 200 according to the fourth embodiment is a method of separating the filter body 6000 into individual pieces by proceeding with the scribe 6000b formed in the second substrate wafer 5000 to break it first and then proceeding with the scribe 6000a formed in the first substrate wafer 4000C to break it. Due to separating the filter body 6000 into individual pieces as described above, the load J4 is applied as shown in FIG. 13. Then, the filter body 6000 is bent with the support position P4 as a support point, and an end 21d of a second mirror forming surface 21c of the second substrate 21 on which the connection electrodes 61b and 62b and the ground electrode 80b are formed is brought close to the connection electrodes 51b and 52b and the ground electrode 70b, which are formed on the first mirror forming surface 11a that becomes an electrode forming surface of the first substrate 11, so as to collide therewith. However, due to the protruding portions 11e, 11f, 11g, and 11h that are formed on the first substrate 11 and have a larger protruding amount than the thickness of the connection electrodes 51b and 52b and the ground electrode 70b, it is possible to prevent the end 21d of the second substrate 21 from reaching the connection electrodes 51b and 52b and the ground electrode 70b of the first substrate 11. Thus, when breaking the filter body 6000, it is possible to prevent damage to or breakage of the connection electrodes 51b and 52b and the ground electrode 70b of the first substrate 11 due to the contact of the end of the second substrate 21. As a result, it is possible to suppress the occurrence of the etalon filter 200 that becomes a defective product.

Fifth Embodiment

Figure 14:
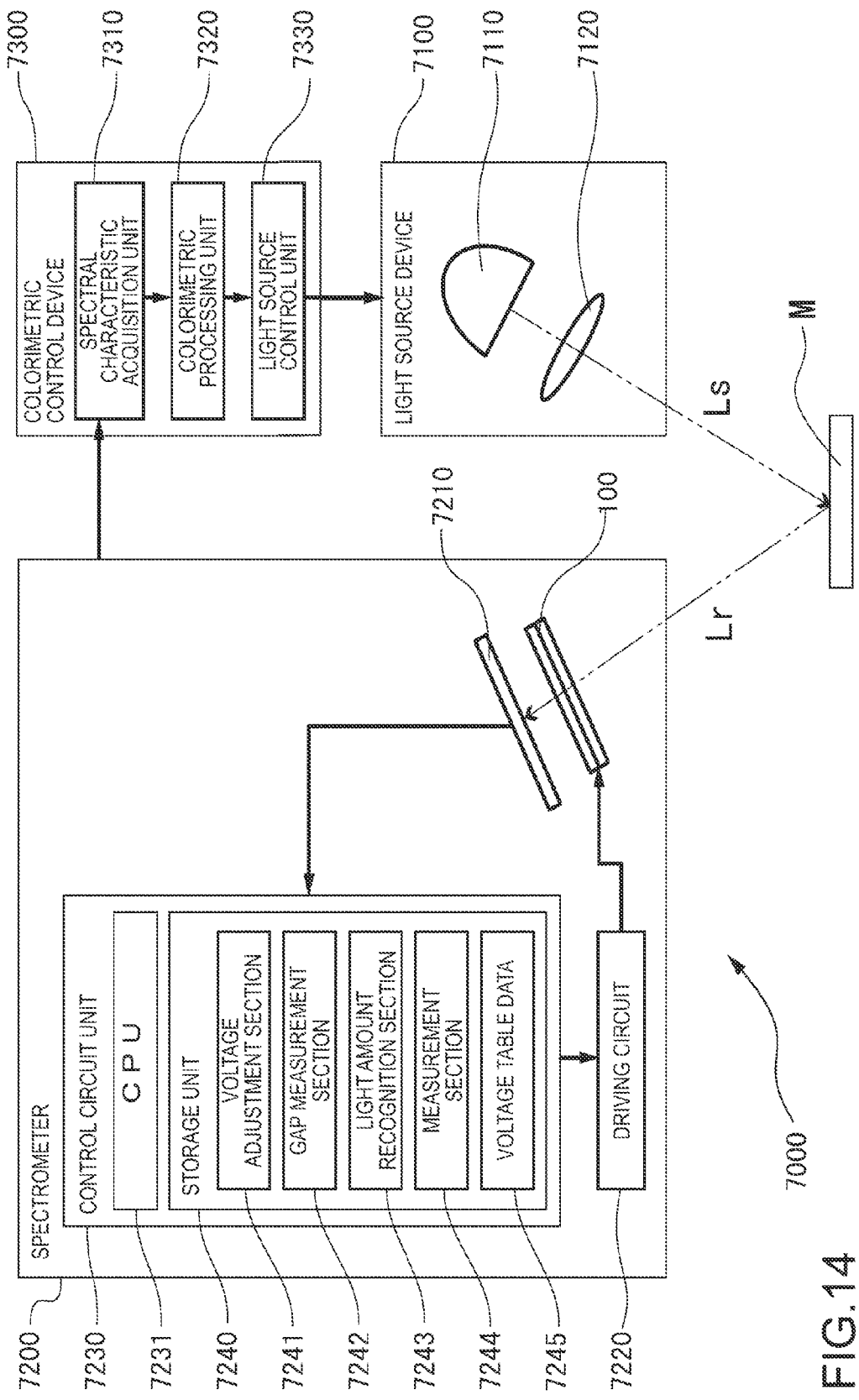
FIG. 14 is a block diagram showing the schematic configuration of a colorimetric apparatus according to a fifth embodiment.

As a fifth embodiment, a colorimetric apparatus for measuring color will be described as an example of an optical apparatus including the etalon filter 100 according to the first embodiment or the etalon filter 200 according to the second embodiment. FIG. 14 is a block diagram showing an example of a colorimetric apparatus according to the fifth embodiment. In addition, a colorimetric apparatus including the etalon filter 100 will be described in the present embodiment.

As shown in FIG. 14, a colorimetric apparatus 7000 includes a light source device 7100, a spectrometer 7200, and a colorimetric control device 7300. In the colorimetric apparatus 7000, emission light Ls that is, for example, white light is emitted from the light source device 7100 toward the test target M, and light to be examined Lr that is light reflected by the test target M is incident on the spectrometer 7200. The spectrometer 7200 separates the light to be examined Lr, and performs spectral characteristic measurement for measuring the amount of separated light having each wavelength. The etalon filter 100 according to the first embodiment is provided in the spectrometer 7200, and the light to be examined Lr is incident on the etalon filter 100 and the amount of transmitted light in a predetermined wavelength range is measured. From the amount of light in various wavelength ranges, colorimetric processing is executed according to the color included in the test target M, that is, the amount of light included in each wavelength range.

The light source device 7100 includes alight source 7110 and a group 7120 of a plurality of lenses (in FIG. 14, one lens is simply shown), and emits white light to the test target M as test light Ls. The lens group 7120 includes a collimator lens (not shown). The white light emitted from the light source 7110 is made to be the test light Ls that is parallel light by the collimator lens, and the test light Ls is emitted toward the test target M through a projection lens (not shown) included in the lens group 7120.

The spectrometer 7200 includes the etalon filter 100, a light receiving unit 7210 including a light receiving element, a driving circuit 7220, and a control circuit unit 7230. In addition, the spectrometer 7200 includes an incidence optical lens (not shown) that is provided at a position facing the etalon filter 100 and that guides the light to be examined Lr, which is reflected light reflected by the test target M, thereinside.

The light receiving unit 7210 is formed by a photoelectric conversion element (light receiving element), and generates an electrical signal corresponding to the amount of received light. The light receiving unit 7210 is connected to the control circuit unit 7230, and the generated electrical signal is input to the control circuit unit 7230 as a light receiving signal. In addition, it is possible to form a wavelength tunable interference filter module by unifying the etalon filter 100 and the light receiving unit 7210.

The driving circuit 7220 is connected to the connection electrodes 51b, 52b, 61b, and 62b (refer to the FIGS. 1B and 1C) of the etalon filter 100 and the control circuit unit 7230. The driving circuit 7220 applies a driving voltage between the first and second driving electrodes 50 and 60 on the basis of a driving control signal input from the control circuit unit 7230, so that the diaphragm portion 10c is deformed to move the first optical film 30 of the first substrate 10 to a predetermined displacement position. A driving voltage may be applied so that there is a desired potential difference between the first and second driving electrodes 50 and 60. For example, a predetermined voltage may be applied to the second driving electrode 60, and the first driving electrode 50 may be grounded. In addition, it is preferable to use a DC voltage as a driving voltage.

The control circuit unit 7230 controls the overall operation of the spectrometer 7200, and is configured to include a CPU 7231, a storage unit 7240, and the like. The CPU 7231 executes spectroscopic measurement processing on the basis of various kinds of programs and data stored in the storage unit 7240. The storage unit 7240 includes, for example, a random access memory (RAM), a hard disk, and the like as storage media, and stores a program or data appropriately so as to be readable. The storage unit 7240 includes a voltage adjustment section 7241, a gap measurement section 7242, a light amount recognition section 7243, and a measurement section 7244. In addition, voltage table data 7245 that associates the value of a voltage, which is applied to the first and second driving electrodes 50 and 60 to adjust the gap G shown in FIG. 1A, with an application time at the voltage is stored in the storage unit 7240.

The colorimetric control device 7300 is connected to the light source device 7100 and the spectrometer 7200, and performs control of the light source device 7100 and colorimetric processing based on the spectral characteristics acquired by the spectrometer 7200. As the colorimetric control device 7300, for example, a general-purpose personal computer, a personal digital assistant, a computer dedicated to color measurement, and other information processing apparatuses can be used. In addition, the colorimetric control device 7300 is configured to include a spectral characteristic acquisition unit 7310, a colorimetric processing unit 7320, and a light source control unit 7330.

The spectral characteristic acquisition unit 7310 is connected to the spectrometer 7200, and acquires the spectral characteristics input from the spectrometer 7200. The colorimetric processing unit 7320 executes colorimetric processing for measuring the chromaticity of the test target M on the basis of the spectral characteristics acquired by the spectral characteristic acquisition unit 7310. In the colorimetric processing, for example, processing for showing the spectral characteristics acquired from the spectrometer 7200 using a graph, processing for displaying and outputting the spectral characteristics using a display or a printer as a display unit (not shown), and the like are performed. The light source control unit 7330 is connected to the light source device 7100, and outputs a control signal to the light source device 7100 on the basis of setting data, which is input through an input unit (not shown), so that the predetermined emission light Ls is emitted from the light source device 7100.

Figure 15:
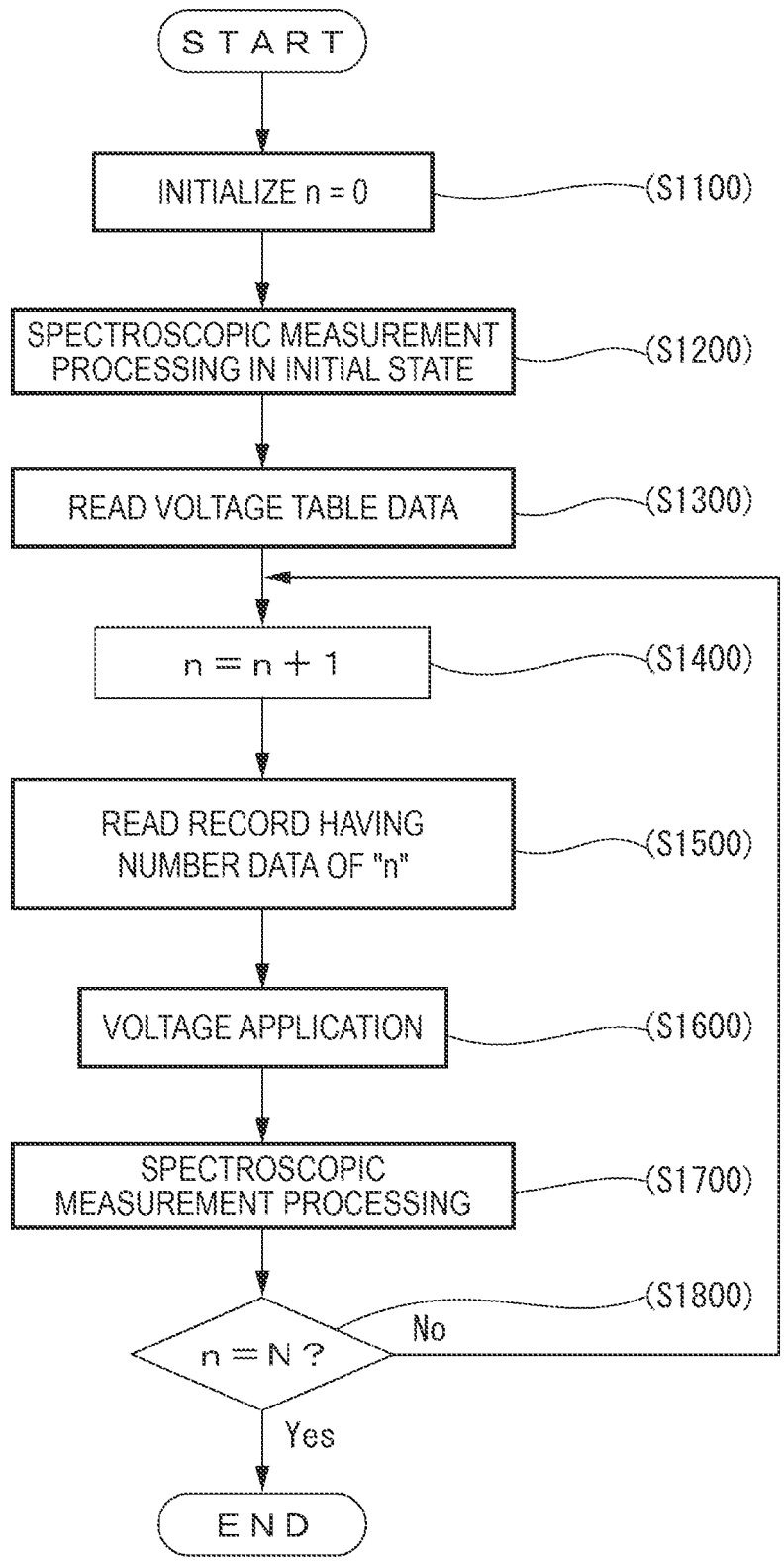
FIG. 15 is a flowchart showing a color measurement method using the colorimetric apparatus according to the fifth embodiment.

FIG. 15 is a flowchart showing the operation of spectroscopic measurement of the colorimetric apparatus 7000 configured as described above. First, the CPU 7231 of the control circuit unit 7230 starts the voltage adjustment section 7241, the light amount recognition section 7243, and the measurement section 7244. In addition, the CPU 7231 initializes a measurement count variable n to an initial state (sets n=0) (step S1100). In addition, the measurement count variable n is an integer of 0 or more.

Then, the measurement section 7244 measures the amount of light transmitted through the etalon filter 100 in the initial state, that is, in a state where no voltage is applied to the first and second driving electrodes 50 and 60 of the etalon filter 100 (step S1200). In addition, the size of the gap G (refer to FIG. 1A) in the initial state may be measured in advance, for example, when manufacturing the spectrometer and be stored in the storage unit 7240. In addition, the amount of transmitted light in the initial state obtained as described above and the size of the gap G (refer to FIG. 1A) are output to the colorimetric control device 7300.

Then, the voltage adjustment section 7241 reads the voltage table data 7245 stored in the storage unit 7240 (step S1300). In addition, the voltage adjustment section 7241 adds "1" to the measurement count variable n (step S1400).

Then, the voltage adjustment section 7241 acquires the voltage data and the voltage application time data of the first and second driving electrodes 50 and 60 corresponding to the measurement count variable n from the voltage table data 7245 (step S1500). Then, the voltage adjustment section 7241 outputs a driving control signal to the driving circuit 7220, applies a voltage to the first and second driving electrodes 50 and 60 according to the data of the voltage table data 7245, and performs processing for driving the etalon filter 100 (step S1600).

Then, the measurement section 7244 performs spectroscopic measurement processing at a timing at which the application time has passed (step S1700). That is, the measurement section 7244 causes the light amount recognition section 7243 to measure the amount of transmitted light. In addition, the measurement section 7244 performs control of outputting a spectroscopic measurement result, in which the amount of measured transmitted light is associated with the wavelength of transmitted light, to the colorimetric control device 7300. In addition, for the measurement of the amount of light, light amount data of multiple times or all pieces of light amount data may be stored in the storage unit 7240. Each amount of light may be collectively measured after the acquisition of the light amount data of multiple times or all pieces of light amount data.

Then, the CPU 7231 determines whether or not the measurement count variable n has reached a maximum value N (step S1800). When it is determined that the measurement count variable n is N, a series of spectroscopic measurement operations are ended. On the other hand, when the measurement count variable n is less than N in step S1800, the process returns to step S1400 to add "1" to the measurement count variable n, and the processing of steps S1500 to S1800 is repeated.

Sixth Embodiment

Figure 16:
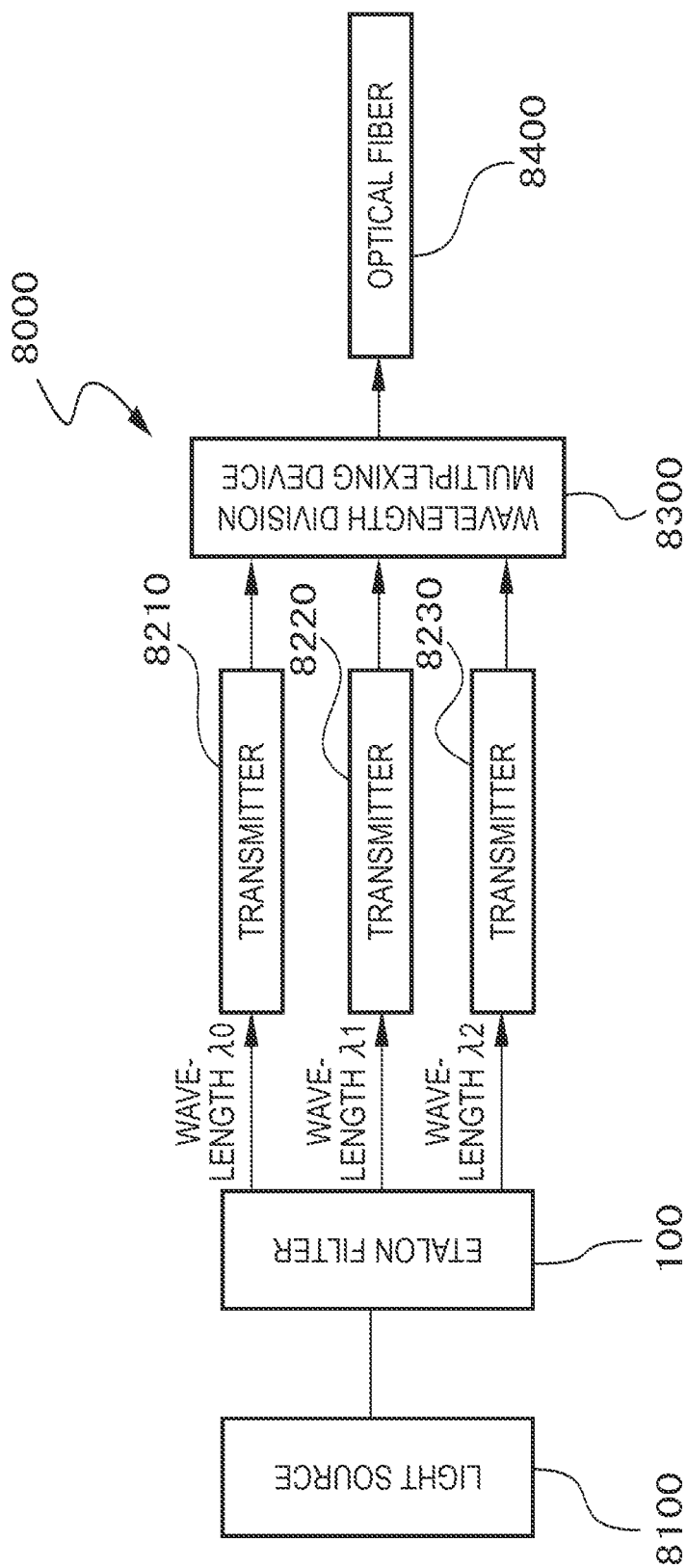
FIG. 16 is a block diagram showing the schematic configuration of a transmitter of a wavelength division multiplexing communication system according to a sixth embodiment.

FIG. 16 is a block diagram showing the schematic configuration of a transmitter of a wavelength division multiplexing communication system, which is an example of an optical apparatus according to a sixth embodiment, including the etalon filter 100 according to the first embodiment or the etalon filter 200 according to the second embodiment. In addition, a transmitter including the etalon filter 100 will be described in the present embodiment. In wavelength division multiplexing (WDM) communication, it is possible to increase the amount of data transmission without increasing the number of optical fiber lines by using a plurality of optical signals with different wavelengths in a multiplexing way within one optical fiber using the characteristics in which signals with different wavelengths do not interfere with each other.

As shown in FIG. 16, a wavelength division multiplexing transmitter 8000 includes the etalon filter 100 on which light from a light source 8100 is incident. Since light beams having a plurality of wavelengths $\lambda 0$, $\lambda 1$, and $\lambda 2$ are transmitted through the etalon filter 100, transmitters 8210, 8220, and 8230 are provided for the respective wavelengths. Light pulse signals of a plurality of channels from the transmitters 8210, 8220, and 8230 are combined as a single signal by a wavelength division multiplexing device 8300, and are transmitted to one optical fiber 8400 on the transmission path.

In addition, the etalon filter 100 according to the first embodiment or the etalon filter 200 according to the second embodiment can also be similarly applied to an optical code division multiplexing (OCDM) transmitter. In the OCDM, since light pulses that form a light pulse signal include light components having different wavelengths, a channel is identified by pattern matching of encoded light pulses.

Other Embodiments

In addition, the invention is not limited to the embodiments described above, but various modifications or improvements may be made without departing from the scope and spirit of the invention. As an optical apparatus according to the invention, the spectrometer 7000 has been illustrated in the fifth embodiment. However, a method of driving a wavelength tunable interference filter, an optical module, and an electronic apparatus according to the invention can be applied in various fields. For example, the etalon filter 100 according to the first embodiment or the etalon filter 200 according to the second embodiment can be used in a light-based system for detecting the presence of a specific material. As examples of such a system, an in-vehicle gas leak detector that performs high-sensitivity detection of a specific gas by adopting a spectroscopic measurement method using the etalon filters 100 and 200 or a gas detector, such as a photoacoustic rare gas detector for breast test, can be exemplified. An example of such a gas detector will now be described as a seventh embodiment with reference to the accompanying drawings.

Figure 17:
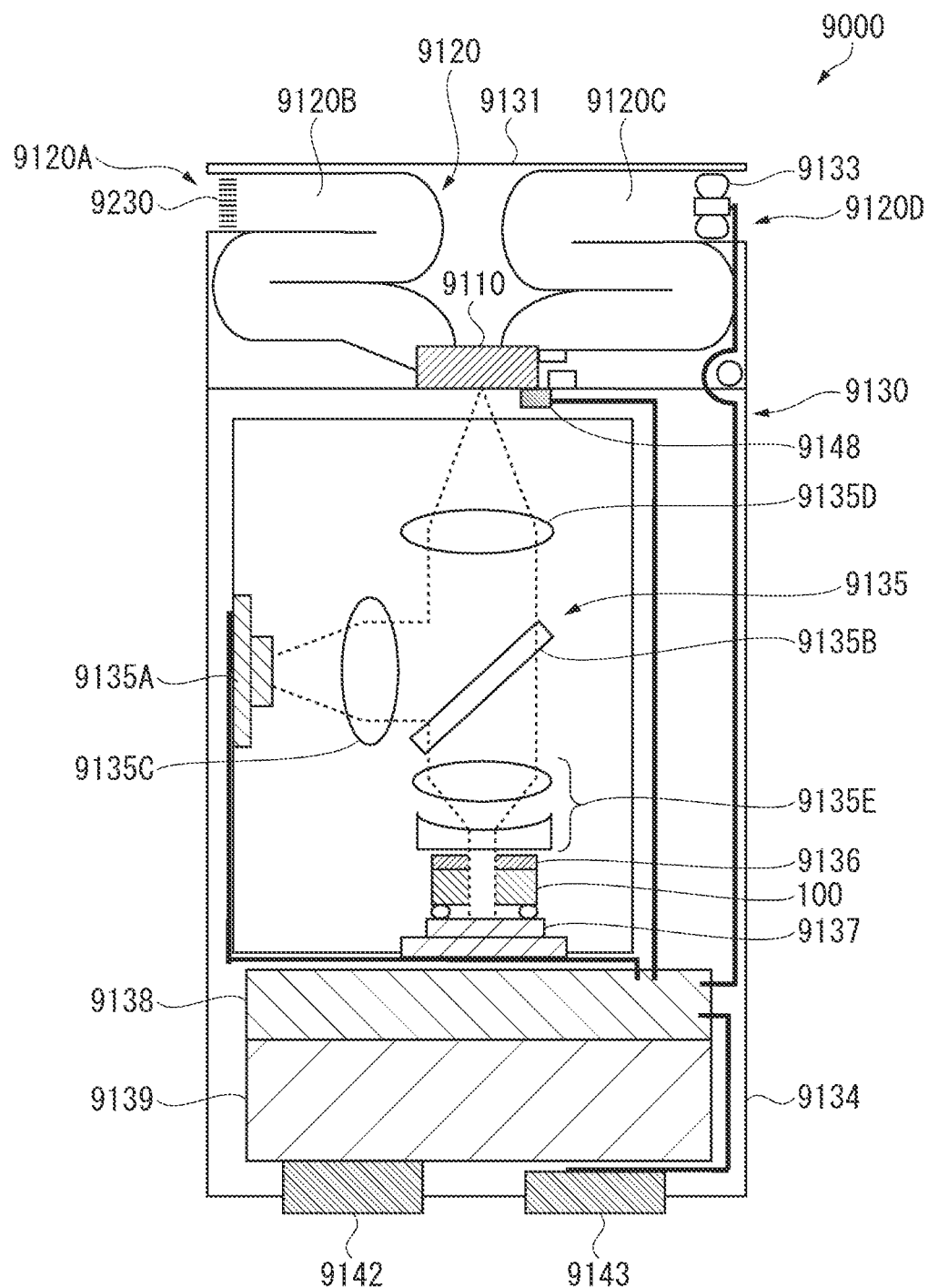
FIG. 17 is a schematic diagram showing a gas detector according to another embodiment.
Figure 18:
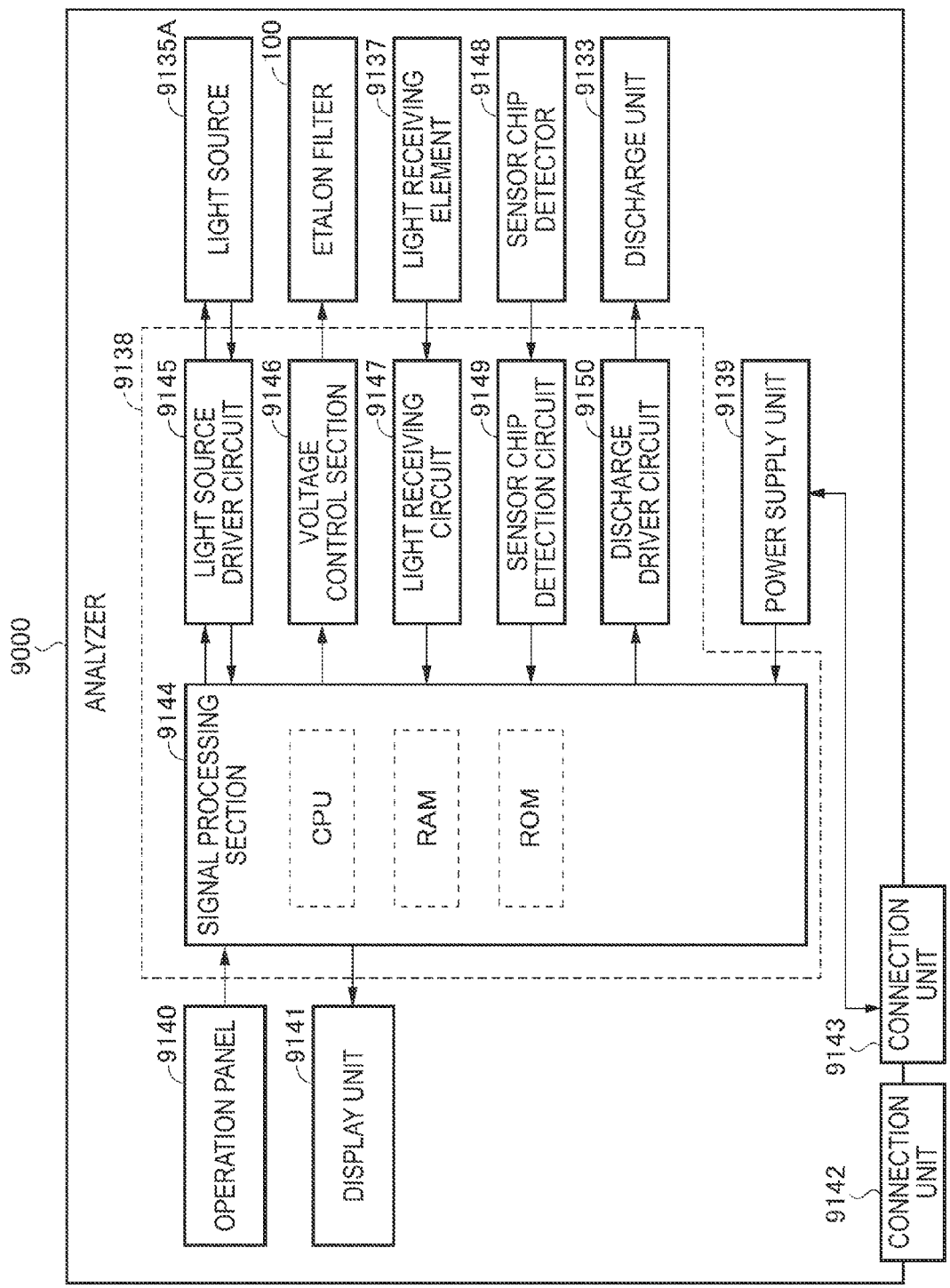
FIG. 18 is a block diagram showing the configuration of a control system of the gas detector according to another embodiment.

FIG. 17 is a schematic diagram showing an example of a gas detector including the etalon filter 100 according to the first embodiment. FIG. 18 is a block diagram showing the configuration of a control system of the gas detector shown in FIG. 17. As shown in FIG. 17, a gas detector 9000 is configured to include: a sensor chip 9110; a flow path 9120 including a suction port 9120A, a suction flow path 9120B, a discharge flow path 9120C, and a discharge port 9120D; and a main body 9130.

The main body 9130 is configured to include: a detection device (optical module) including a sensor unit cover 9131 having an opening through which the flow path 9120 can be attached or detached, a discharge unit 9133, a housing 9134, an optical unit 9135, a filter 9136, the etalon filter 100, and a light receiving element 9137 (detection unit); a control unit 9138 (processing unit) that processes a detected signal and controls the detection unit; and a power supply unit 9139 that supplies electric power. In addition, the optical unit 9135 is configured to include a light source 9135A that emits light, a beam splitter 9135B that reflects the light incident from the light source 9135A toward the sensor chip 9110 side and transmits the light incident from the sensor chip 9110 side toward the light receiving element 9137 side, and lenses 9135C, 9135D, and 9135E. In addition, as shown in FIG. 18, an operation panel 9140, a display unit 9141, a connection unit 9142 for interface with the outside, and the power supply unit 9139 are provided on the surface of the gas detector 9000. When the power supply unit 9139 is a secondary battery, a connection unit 9143 for charging may be provided.

In addition, as shown in FIG. 18, the control unit 9138 of the gas detector 9000 includes a signal processing section 9144 formed by a CPU or the like, a light source driver circuit 9145 for controlling the light source 9135A, a voltage control section 9146 for controlling the etalon filter 100, a light receiving circuit 9147 that receives a signal from the light receiving element 9137, a sensor chip detection circuit 9149 that reads a code of the sensor chip 9110 and receives a signal from a sensor chip detector 9148 that detects the presence of the sensor chip 9110, and a discharge driver circuit 9150 that controls the discharge unit 9133.

Next, the operation of the above gas detector 9000 will be described below. The sensor chip detector 9148 is provided inside the sensor unit cover 9131 located in the upper portion of the main body 9130, and the presence of the sensor chip 9110 is detected by the sensor chip detector 9148. When a detection signal from the sensor chip detector 9148 is detected, the signal processing section 9144 determines that the sensor chip 9110 is mounted, and outputs a display signal to display "detection operation is executable" on the display unit 9141.

Then, for example, when the operation panel 9140 is operated by the user and an instruction signal indicating the start of detection processing is output from the operation panel 9140 to the signal processing section 9144, the signal processing section 9144 first outputs a signal for operating the light source to the light source driver circuit 9145 to operate the light source 9135A. When the light source 9135A is driven, linearly-polarized stable laser light with a single wavelength is emitted from the light source 9135A. In addition, a temperature sensor or a light amount sensor is provided in the light source 9135A, and the information is output to the signal processing section 9144. In addition, when it is determined that the light source 9135A is stably operating on the basis of the temperature or the amount of light input from the light source 9135A, the signal processing section 9144 operates the discharge unit 9133 by controlling the discharge driver circuit 9150. Then, a gas sample containing a target material (gas molecules) to be detected is guided from the suction port 9120A to the suction flow path 9120B, the inside of the sensor chip 9110, the discharge flow path 9120C, and the discharge port 9120D. In addition, a dust filter 9230 is provided on the suction port 9120A in order to remove relatively large dust particles, some water vapor, and the like.

In addition, the sensor chip 9110 is a sensor in which a plurality of metal nanostructures are included and which uses localized surface plasmon resonance. In such a sensor chip 9110, an enhanced electric field is formed between the metal nanostructures by laser light. When gas molecules enter the enhanced electric field, Rayleigh scattered light and Raman scattered light including the information of molecular vibration are generated. Such Rayleigh scattered light or Raman scattered light is incident on the filter 9136 through the optical unit 9135, and the Rayleigh scattered light is separated by the filter 9136 and the Raman scattered light is incident on the etalon filter 100. In addition, the signal processing section 9144 outputs a control signal to the voltage control section 9146. Then, the voltage control section 9146 drives the etalon filter 100, and separates the Raman scattered light corresponding to gas molecules to be detected using the etalon filter 100. Then, when the separated light is received by the light receiving element 9137, a light receiving signal corresponding to the amount of received light is output to the signal processing section 9144 through the light receiving circuit 9147. In this case, the desired Raman scattered light can be accurately extracted from the etalon filter 100. The signal processing section 9144 determines whether or not the gas molecules to be detected obtained as described above are target gas molecules by comparing the spectral data of the Raman scattered light corresponding to the gas molecules to be detected with the data stored in the ROM, and specifies the material. In addition, the signal processing section 9144 displays the result information on the display unit 9141, or outputs the result information to the outside through the connection unit 9142.

In addition, in FIGS. 17 and 18, the gas detector 9000 that separates Raman scattered light using the etalon filter 100 and detects gas from the separated Raman scattered light has been illustrated. However, as a gas detector, it is also possible to use a gas detector that specifies the type of gas by detecting the gas-specific absorbance. In this case, a gas sensor that detects light absorbed by gas, among incident light, after making gas flow into the sensor is used as the optical module according to the invention. In addition, a gas detector that analyzes and determines gas, which flows into the sensor by the gas sensor, is used as the electronic apparatus according to the invention. In such a configuration, it is possible to detect the components of the gas using the etalon filter.

In addition, as a system for detecting the presence of a specific material, a material component analyzer, such as a non-invasive measuring apparatus for obtaining information regarding sugar using near-infrared spectroscopy or a non-invasive measuring apparatus for obtaining information regarding the food, minerals, the body, and the like can be exemplified without being limited to the gas detection described above. Hereinafter, a food analyzer will be described as an example of the material component analyzer.

Figure 19:
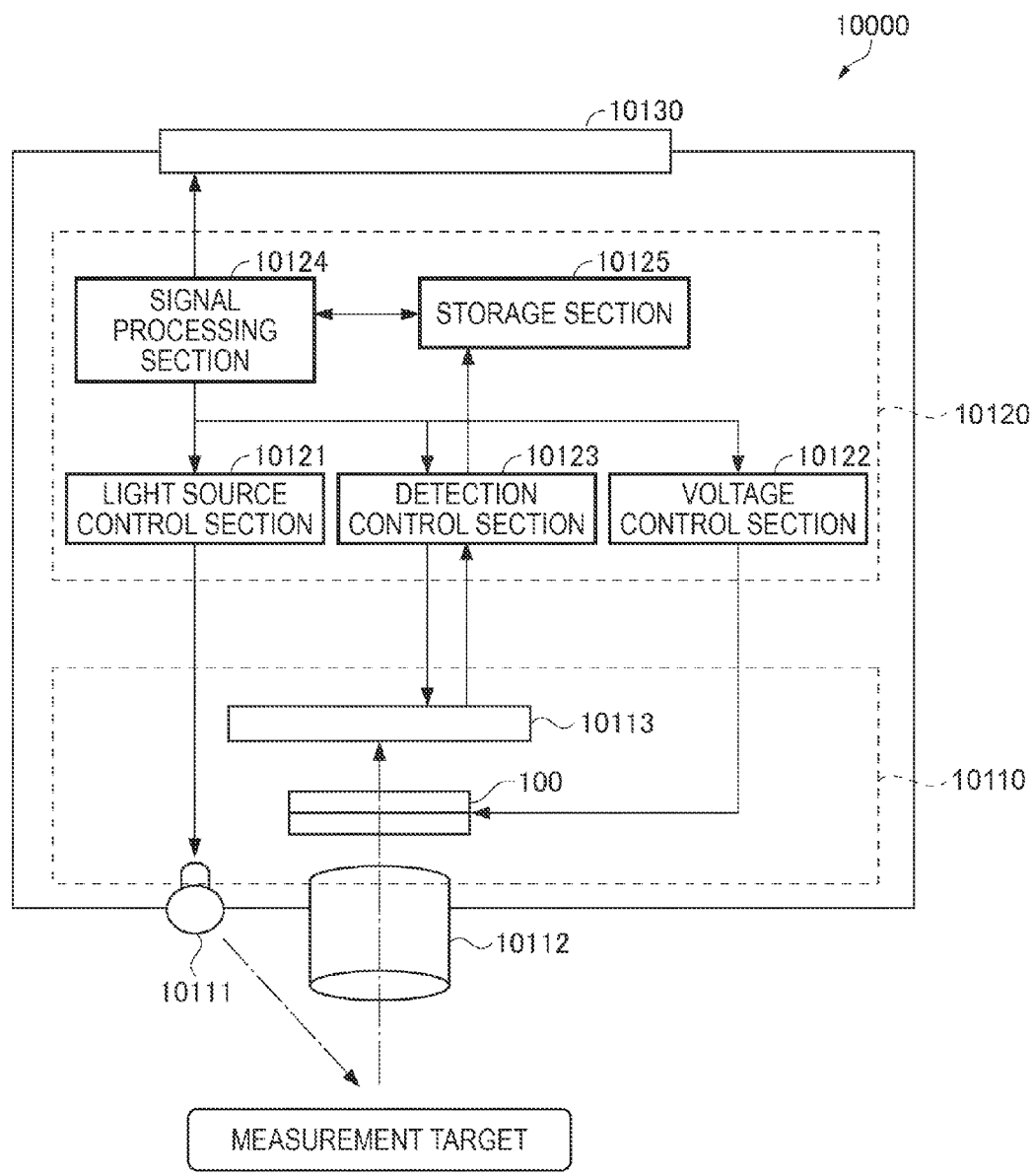
FIG. 19 is a block diagram showing the schematic configuration of a food analyzer according to still another embodiment.

FIG. 19 is a diagram showing the schematic configuration of a food analyzer that is an example of an electronic apparatus using the etalon filter 100. As shown in FIG. 19, a food analyzer 10000 includes a detector 10110 (optical module), a control unit 10120, and a display unit 10130. The detector 10110 includes a light source 10111 that emits light, an imaging lens 10112 to which light from a measurement target is introduced, the etalon filter 100 that separates the light introduced to the imaging lens 10112, and an imaging unit 10113 (detection unit) that detects the separated light. In addition, the control unit 10120 includes a light source control section 10121 that performs ON/OFF control of the light source 10111 and brightness control at the time of lighting, a voltage control section 10122 that controls the etalon filter 100, a detection control section 10123 that controls the imaging unit 10113 and acquires a spectral image captured by the imaging unit 10113, a signal processing section 10124, and a storage section 10125.

In the food analyzer 10000, when the system is driven, the light source control section 10121 controls the light source 10111 so that light is emitted from the light source 10111 to the measurement target. Then, light reflected by the measurement target is incident on the etalon filter 100 through the imaging lens 10112. By the control of the voltage control section 10122, the etalon filter 100 is driven according to the driving method shown in the first embodiment. Therefore, light with a desired wavelength can be accurately extracted from the etalon filter 100. In addition, the extracted light can be imaged by the imaging unit 10113 formed by a CCD camera, for example. In addition, the imaged light is stored in the storage section 10125 as a spectral image. In addition, the signal processing section 10124 changes the value of a voltage applied to the etalon filter 100 by controlling the voltage control section 10122, thereby obtaining a spectral image for each wavelength.

Then, the signal processing section 10124 calculates a spectrum in each pixel by performing arithmetic processing on the data of each pixel in each image stored in the storage section 10125. In addition, for example, information regarding the components of the food for the spectrum is stored in the storage section 10125. The signal processing section 10124 analyzes the data of the obtained spectrum on the basis of the information regarding the food stored in the storage section 10125, and calculates food components contained in the detection target and the content. In addition, food calories, freshness, and the like can be calculated from the obtained food components and content. In addition, by analyzing the spectral distribution in the image, it is possible to extract a portion, of which freshness is decreasing, in the food to be examined. In addition, it is also possible to detect foreign matter contained in the food. Then, the signal processing section 10124 performs processing for displaying the information obtained as described above, such as the components or the content of the food to be examined and the calories or freshness of the food to be examined, on the display unit 10130.

In addition, although an example of the food analyzer 10000 is shown in FIG. 19, the invention can also be used as a non-invasive measuring apparatus for obtaining the information other than that described above by applying substantially the same configuration. For example, the invention can be applied to a biological analyzer for the analysis of biological components involving the measurement and analysis of body fluids, such as blood. For example, if an apparatus that detects ethyl alcohol is used as the apparatus for measuring the body fluids, such as blood, the biological analyzer can be used as a drunk driving prevention apparatus that detects the drinking level of the driver. In addition, the invention can also be applied to an electronic endoscope system including such a biological analyzer. In addition, the invention can also be applied to a mineral analyzer for analyzing the components of minerals.

In addition, the etalon filter and the electronic apparatus of the invention can be applied to the following apparatuses. For example, it is possible to transmit data with light of each wavelength by changing the intensity of light of each wavelength with time. In this case, data transmitted by light with a specific wavelength can be extracted by separating the light with a specific wavelength using the etalon filter provided in the optical module and receiving the light with a specific wavelength using a light receiving unit. By processing the data of light of each wavelength using an electronic apparatus including such an optical module for data extraction, it is also possible to perform optical communication.

Figure 20:
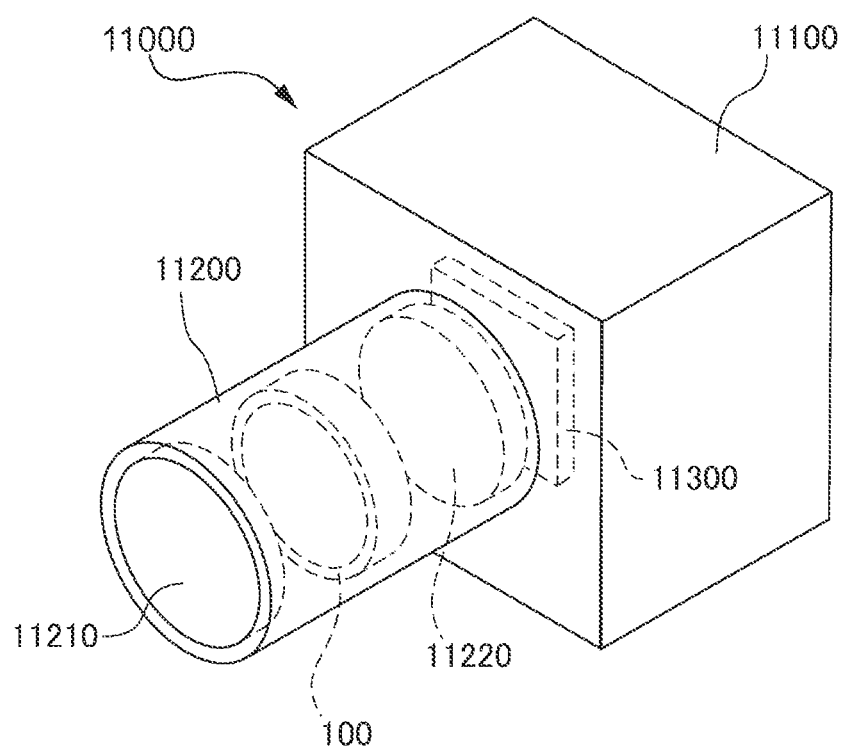
FIG. 20 is a schematic diagram showing the configuration of a spectral camera according to still another embodiment.

In addition, the electronic apparatus of the invention can also be applied to a spectral camera, a spectral analyzer, and the like for capturing a spectral image by separating light using the etalon filter according to the invention. As an example of such a spectral camera, an infrared camera including the etalon filter can be mentioned. FIG. 20 is a schematic diagram showing the configuration of a spectral camera. As shown in FIG. 20, a spectral camera 11000 includes a camera body 11100, an imaging lens unit 11200, and an imaging unit 11300 (detection unit). The camera body 11100 is a portion gripped and operated by the user. The imaging lens unit 11200 is provided on the camera body 11100, and guides incident image light to the imaging unit 11300. In addition, as shown in FIG. 20, the imaging lens unit 11200 is configured to include an objective lens 11210, an imaging lens 11220, and the etalon filter 100 provided between these lenses. The imaging unit 11300 is formed of a light receiving element, and images the image light guided by the imaging lens unit 11200.

In the spectral camera 11000, a spectral image of light with a desired wavelength can be captured by transmitting the light with a wavelength to be imaged using the etalon filter 100. In this case, a voltage control unit (not shown) drives the etalon filter 100 for each wavelength using the driving method according to the first embodiment of the invention, so that image light of a spectral image with a desired wavelength can be accurately extracted.

In addition, the etalon filter according to the invention may be used as a band pass filter. For example, the etalon filter according to the invention can be used as an optical laser device that separates and transmits only light in a narrow band having a predetermined wavelength at the center of light in a predetermined wavelength band emitted from a light emitting element. In addition, the etalon filter according to the invention may be used as a biometric authentication device. For example, the etalon filter according to the invention can also be applied to authentication devices of blood vessels, fingerprints, a retina, and an iris using light in a near infrared region or a visible region.

In addition, the electronic apparatus can be used as a concentration detector. In this case, using the etalon filter, infrared energy (infrared light) emitted from a material is separated and analyzed, and the analyte concentration in a sample is measured.

As described above, the etalon filter and the electronic apparatus according to the invention can be applied to any apparatus that separates predetermined light from incident light. In addition, since the etalon filter according to the invention can separate light beams with a plurality of wavelengths using one device as described above, measurement of the spectrum of a plurality of wavelengths, and detection of a plurality of components can be accurately performed. Accordingly, compared with a known apparatus that extracts a desired wavelength using a plurality of devices, it is possible to make an optical module or an electronic apparatus small. Therefore, the etalon filter according to the invention can be appropriately used as a portable optical device or an optical device for a vehicle, for example.

In addition, the specific structure when implementing the invention can be appropriately changed to other structures in a range where the object of the invention can be achieved. In addition, the invention is not limited to the wavelength tunable interference filter and the optical apparatus including a wavelength tunable interference filter, but can also be similarly applied to an optical component in which first and second substrates are disposed so as to face each other, a part of the second substrate is disposed so as to extend from the first substrate in plan view when the first and second substrates are viewed from a thickness direction, and the second substrate includes an external connection electrode, which extends from a region where the first and second substrates face each other toward a region of the second substrate extending from the first substrate, and an electrode forming surface, which is the region of the second substrate extending from the first substrate and on which the external connection electrode is formed.

The entire disclosure of Japanese Patent Application No. 2012-219140 filed on Oct. 1, 2012 is expressly incorporated by reference herein.

What is claimed is:

1. A wavelength tunable interference filter, comprising:
   a first substrate;
   a second substrate that is disposed so as to face the first substrate and includes a support portion that supports the first substrate;
   a first optical film provided on the first substrate;
   a first driving electrode that is provided on the first substrate and that is located outside the first optical film in plan view;
   a second optical film that is provided on the second substrate and that is disposed so as to face the first optical film; and
   a second driving electrode that is provided on the second substrate and that is disposed between the second optical film and the support portion so as to face the first driving electrode in the plan view,
   wherein the second substrate includes an external connection electrode extending to an outer side of the support portion, and includes an electrode forming surface on which the external connection electrode is disposed, and
   a plurality of protruding portions protruding from the electrode forming surface are formed so as to be arrayed in a direction crossing the extending direction of the external connection electrode.

2. The wavelength tunable interference filter according to claim 1,
   wherein a top of each of the protruding portions in a protruding direction is on the same plane as an optical film forming surface of the second substrate on which the second optical film is formed.

3. The wavelength tunable interference filter according to claim 1,
   wherein the first substrate includes a bonding region of the first substrate for bonding to the support portion of the second substrate and an external connection electrode extending to an outer side of the bonding region, and includes an electrode forming surface on which the external connection electrode is disposed, and
   a plurality of protruding portions protruding from the electrode forming surface are formed so as to be arrayed in a direction crossing the extending direction of the external connection electrode.

4. A method of manufacturing a wavelength tunable interference filter including a first substrate, which includes a first optical film and a first driving electrode formed outside the first optical film in plan view, and a second substrate, which includes a support portion that supports the first substrate, a second optical film disposed so as to face the first optical film, and a second driving electrode disposed between the second optical film and the support portion so as to face the first driving electrode, the method comprising:
   forming a first wafer that is a collection of a plurality of the first substrates;
   forming a second wafer that is a collection of a plurality of the second substrates;
   forming a bonded wafer by bonding the first and second wafers to each other such that the first and second optical films face each other; and
   separating the bonded wafer into individual pieces,
   wherein the forming of the second wafer includes forming the support portion and an optical film forming surface, on which the second optical film is formed, by etching and forming a plurality of protruding portions on a driving electrode arrangement surface, on which the second driving electrode is disposed, and the driving electrode arrangement surface outside the support portion by etching.

5. An optical apparatus, comprising:
   the wavelength tunable interference filter according to claim 1.

6. An optical apparatus, comprising:
   the wavelength tunable interference filter according to claim 2.

7. An optical apparatus, comprising:
   the wavelength tunable interference filter according to claim 3.

8. The optical apparatus according to claim 5,
   wherein a top of each of the protruding portions in a protruding direction is on the same plane as an optical film forming surface of the second substrate on which the second optical film is formed.

9. The optical apparatus according to claim 6,
   wherein a top of each of the protruding portions in a protruding direction is on the same plane as an optical film forming surface of the second substrate on which the second optical film is formed.

10. The optical apparatus according to claim 7,
    wherein a top of each of the protruding portions in a protruding direction is on the same plane as an optical film forming surface of the second substrate on which the second optical film is formed.

11. An optical component, comprising:
    the wavelength tunable interference filter according to claim 1.

12. An optical component, comprising:
    the wavelength tunable interference filter according to claim 2.

13. An optical component, comprising:
    the wavelength tunable interference filter according to claim 3.

14. An optical component, comprising:
    a first substrate; and
    a second substrate disposed so as to face the first substrate,
    wherein a part of the second substrate is disposed so as to extend from the first substrate in plan view,
    the second substrate includes an external connection electrode, which extends from a region where the first and second substrates face each other toward a region of the second substrate extending from the first substrate, and an electrode forming surface, which is the region of the second substrate extending from the first substrate and on which the external connection electrode is formed, and
    the electrode forming surface includes a plurality of protruding portions, and the plurality of protruding portions are arrayed in a direction crossing the extending direction of the external connection electrode.

* * * * *